(12) United States Patent
Van Gerwen et al.

(10) Patent No.: US 9,730,467 B2
(45) Date of Patent: Aug. 15, 2017

(54) FOOD FORMING DRUM

(75) Inventors: Hendrikus Petrus Gerardus Van Gerwen, Someren (NL); George Boogers, Uden (NL); Hendrik Jan Righold, Oosterhout (NL)

(73) Assignee: GEA FOOD SOLUTIONS BAKEL B.V., Bakel (NL)

(*) Notice: Subject to any disclaimer, the term of this patent is extended or adjusted under 35 U.S.C. 154(b) by 45 days.

(21) Appl. No.: 13/982,377

(22) PCT Filed: Feb. 10, 2012

(86) PCT No.: PCT/EP2012/000610
§ 371 (c)(1),
(2), (4) Date: Sep. 5, 2013

(87) PCT Pub. No.: WO2012/107236
PCT Pub. Date: Aug. 16, 2012

(65) Prior Publication Data
US 2013/0337128 A1 Dec. 19, 2013

(30) Foreign Application Priority Data

Feb. 10, 2011 (EP) .................... 11001069
Mar. 22, 2011 (EP) .................... 11002345
May 3, 2011 (EP) .................... 11003605
Dec. 23, 2011 (EP) .................... 11010186

(51) Int. Cl.
*A22C 7/00* (2006.01)
*A23P 1/10* (2006.01)
*A23P 30/10* (2016.01)

(52) U.S. Cl.
CPC ............ *A23P 1/105* (2013.01); *A22C 7/0038* (2013.01); *A22C 7/0069* (2013.01); *A23P 30/10* (2016.08); *A22C 7/0076* (2013.01); *Y10T 156/10* (2015.01); *Y10T 156/1052* (2015.01)

(58) Field of Classification Search
CPC ... A23C 7/0069; A22C 7/0038; A22C 7/0076; A23P 1/105; A23P 30/10; Y10T 156/10; Y10T 156/1052
USPC ............... 425/227, 237, 363, 405.1, 576
See application file for complete search history.

(56) References Cited

U.S. PATENT DOCUMENTS

| 2,657,423 | A | 11/1953 | Elsaesser |
| 3,177,524 | A | 4/1965 | Gause |
| 3,205,837 | A | 9/1965 | Fay |
| 3,213,486 | A | 10/1965 | Blake |

(Continued)

FOREIGN PATENT DOCUMENTS

| DE | 102006020361 A1 | 8/2007 |
| EP | 0818148 A1 | 1/1998 |

(Continued)

OTHER PUBLICATIONS

International Search Report and Written Opinion PCT/EP2012/000610, mailed Oct. 8, 2012.

(Continued)

*Primary Examiner* — Seyed Masoud Malekzadeh
(74) *Attorney, Agent, or Firm* — The Dobrusin Law Firm, P.C.

(57) ABSTRACT

The present invention relates to a food forming drum comprising a multitude of rows of cavities. The present invention further relates to the process of manufacturing the inventive drum.

23 Claims, 51 Drawing Sheets

(56) References Cited

U.S. PATENT DOCUMENTS

| | | | |
|---|---|---|---|
| 3,347,176 A | 10/1967 | Hall | |
| 3,724,026 A | 4/1973 | Gernandt | |
| 3,750,232 A | 8/1973 | Holly | |
| 3,823,633 A | 7/1974 | Ross | |
| 3,991,440 A | 11/1976 | Hendrickson, Jr. | |
| 3,998,574 A | 12/1976 | Blake | |
| 4,182,003 A | 1/1980 | Lamartino et al. | |
| 4,418,446 A | 12/1983 | Sandberg | |
| 4,625,612 A | 12/1986 | Oliver | |
| 4,630,425 A | 12/1986 | Reed | |
| 4,630,426 A | 12/1986 | Gentry | |
| 4,768,325 A | 9/1988 | Lindee et al. | |
| 4,957,425 A * | 9/1990 | Fay | 425/362 |
| 4,987,643 A | 1/1991 | Powers | |
| 5,102,238 A | 4/1992 | Contzen | |
| 6,131,372 A | 10/2000 | Pruett | |
| 6,368,092 B1 | 4/2002 | Lindee | |
| 6,371,278 B1 | 4/2002 | Hart et al. | |
| 6,764,293 B2 | 7/2004 | Kashulines et al. | |
| 7,976,303 B2 | 7/2011 | Van der Eerden et al. | |
| 8,770,962 B2 | 7/2014 | Van der Eerden et al. | |
| 9,028,239 B2 * | 5/2015 | Van Gerwen | 425/289 |
| 2005/0013895 A1 | 1/2005 | Azzar | |
| 2005/0042321 A1 | 2/2005 | LaBruno | |
| 2005/0214399 A1 | 9/2005 | LaBruno et al. | |
| 2005/0220932 A1 | 10/2005 | Van Der Eerden | |
| 2007/0224305 A1 * | 9/2007 | Meskendahl et al. | 425/171 |
| 2008/0202226 A1 | 8/2008 | Heim et al. | |
| 2009/0134544 A1 * | 5/2009 | Van Der Eerden et al. | 264/101 |
| 2011/0151082 A1 | 6/2011 | VanGerwen | |
| 2012/0015065 A1 * | 1/2012 | Van Der Eerden et al. | 425/363 |
| 2012/0177786 A1 * | 7/2012 | Van Der Eerden et al. | 426/89 |
| 2013/0045294 A1 | 2/2013 | Van Gerwen et al. | |
| 2013/0164403 A1 | 6/2013 | Boogers et al. | |
| 2013/0224357 A1 | 8/2013 | Van Gerwen | |
| 2013/0273192 A1 | 10/2013 | Van Gerwen | |
| 2013/0280393 A1 | 10/2013 | Van Gerwen | |
| 2013/0291483 A1 | 11/2013 | Van Gerwen | |

FOREIGN PATENT DOCUMENTS

| | | |
|---|---|---|
| EP | 1520480 A1 | 4/2005 |
| EP | 1920847 A1 | 5/2008 |
| EP | 2064956 A1 | 6/2009 |
| FR | 2387609 A1 | 11/1978 |
| GB | 1015820 A | 1/1966 |
| GB | 2312641 A | 11/1997 |
| JP | 2001299317 A | 10/2001 |
| JP | 2005530514 A | 10/2005 |
| WO | 88/07003 A1 | 9/1988 |
| WO | 96/09210 A1 | 3/1996 |
| WO | 2004/002229 A2 | 1/2004 |
| WO | 2004002229 A2 | 1/2004 |
| WO | 2005/009696 A1 | 2/2005 |
| WO | 2005/107481 | 11/2005 |
| WO | 2006/020139 A1 | 2/2006 |
| WO | 2008/091634 A2 | 7/2008 |
| WO | 2010/110655 A1 | 9/2010 |
| WO | 2012/012581 A1 | 1/2012 |
| WO | 2012/055454 A2 | 5/2012 |
| WO | 2012/059188 A1 | 5/2012 |
| WO | 2012/107236 A2 | 8/2012 |

OTHER PUBLICATIONS

International Preliminary Report PCT/EP2012/000610, dated Sep. 19, 2013.
International Preliminary Report PCT/EP2012/000377, dated Aug. 1, 2013.
Potentially related U.S. Appl. No. 13/883,152 Published as 2013/0224357, Aug. 29, 2013.
Potentially related U.S. Appl. No. 13/988,360 Published as 2013/0280393, Oct. 24, 2013.
Potentially related U.S. Appl. No. 13/944,973 Published as 2013/0273192, Oct. 17, 2013.
Potentially related U.S. Appl. No. 13/980,778 Published as 2013/0291483, Nov. 7, 2013.

* cited by examiner

FOOD FORMING DRUM

FIELD

The present invention relates to a food forming drum comprising a multitude of rows of cavities. The present invention further relates to the process of manufacturing the inventive drum.

BACKGROUND

Food forming drums are utilized in machines, which form food products, like patties from a food mass. Such an apparatus is for example described in the U.S. Pat. No. 3,205,837. However the food forming drum described in this patent application is difficult to produce and has hygienic problems.

SUMMARY

It was therefore the objective of the present invention to provide a food forming drum, which does not have the deficiencies of the devices according of the state of the art.

This problem is attained by a food forming drum comprising a multitude of rows of porous product cavities, each row comprising one or a multitude of porous product cavities, the drum preferably comprising a first and a second front end and preferably fluid channels in the longitudinal direction of the drum each fluid channel preferably connecting one row of porous product cavities fluid-wise, wherein the porous product cavities are provided as one or more insert(s) which is/are connected to the drum by an adhesive connection, form- and/or friction-fit.

The disclosure made to this embodiment of the present invention also applies to the other inventive embodiments of the present invention and vice versa.

The present invention relates to a food forming drum, which is part of a food forming apparatus. This food forming drum has at its outer surface a multitude of product cavities, which are open towards the circumference of the drum and in which the food mass is formed into a food product, for example a patty. This food forming drum comprises, according to the present invention, a multitude of rows of product cavities, whereas each row comprises one or a multitude of product cavities, side by side. The rows are arranged in parallel to the middle axis of the inventive drum. During production, the drum turns and in one position the product cavities in one row are filled with the food mass and in a downstream position, the formed food mass is discharged from the product cavities, located in one row. Subsequently, the product cavities in one row of cavities can be filled again and so on. In order to vent the product cavities during their filling and/or in order to support the discharge of the product, the product cavities are at least partially made of a porous material, which is gas-permeable and via which the product cavity can be vented or through which gas, for example air, can be discharged, to loosen the formed product from the surface of the product cavity. Preferably, the porous material comprises channels, which are interconnected.

The food forming drum further preferably comprises fluid channels, which extend in the longitudinal direction of the drum, i.e. parallel to the center axis of the drum and extend preferably from one end to the other end of the drum. Via each fluid channel, ventilation air can be discharged, for example to the ambient, and/or compressed gas can be forced into the cavities to discharge the formed product. Additionally, a cleaning fluid can be forced through the channels and/or the porous material of the product cavities.

The ends of the drum can be covered with an end cap, respectively or can be open.

According to the present invention, the porous product cavity is provided as an insert, which is fixed to the drum. This embodiment of the present invention has the advantage that the drum itself does not need to have a porous layer. Each insert may comprise a porous part or is preferably made entirely from porous material. One insert may comprise more than one porous product cavity. In a preferred embodiment, all porous cavities of one row are provided as one insert. According to another preferred embodiment, more than one insert is provided per row.

According to a preferred embodiment, the porous part comprises a back-up ring. This back-up ring covers at least a portion of the porous part, for example the circumference and/or the front edge at least partially. This assures that the porous material is protected and/or that gas does not leak through surface areas of the porous material, where a gas-flow is not needed or not wanted.

Alternatively or additionally, the surface area of the porous material, where a gas flow is not needed or even not wanted, can be machined such, that the pores are at least partially, preferably entirely closed.

According to the present invention, each porous insert is connected to the drum by an adhesive connection, form- and/or friction-fit. Additionally or alternatively, two inserts are connected by an adhesive connection, form- and/or friction-fit. This embodiment of the present invention assures that the porous product cavity and/or the inserts stay in their desired position during filling, discharge of the product and/or cleaning of the drum and/or that there is no gap between the drum and the insert and/or between two inserts, into which food product can migrate. The inventive drum is very hygienic, easy to produce and to clean. The drum will, preferably be provided with recesses for the porous material or an insert that comprises or is entirely made from the porous material. In this recess, the porous material and/or the insert is placed and then connected to the drum by an adhesive connection, form- and/or friction-fit. An adhesive connection can be, for example, attained by gluing, welding, brazing and/or soldering. A form- and/or friction-connection can be achieved by mechanically bonding the porous material or the porous insert to the drum.

Preferably, the connection between the insert and the drum is irreversible, i.e. it cannot be loosened without destroying the drum, the connection and/or the insert.

A preferred way to solder is known as flux-free soldering. Here the solder is provided in the form of a film/foil (suitable for use in the food processing industry) will be wrapped around the circumference of the insert, particularly provided in the contact area between the insert and the drum, preferably its outer member. Subsequently both, the insert and the film/foil, will be placed into the recess of the drum, particularly its outer member. Then the drum assembly will be heated for a certain time period and temperature, for example, in an oven. Preferably this heating process takes place under vacuum. The foil/film will melt and form a solder connection between insert and recess of the drum. Subsequently, the drum will be cooled down again. This method gives a good connection between the insert and the drum and the process is stable and clean. However other methods to obtain an adhesive connection between the insert and the drum are feasible as well.

The porous part of the porous product cavities and/or the insert are, preferably or according to another or a preferred embodiment of the present invention, connected to the drum by bridges of a plastic material, for example epoxy, and/or a molten metal or a molten alloy.

The disclosure made to this embodiment of the present invention also applies to the other inventive embodiments of the present invention and vice versa.

According to another inventive or preferred embodiment of the present invention, the porous product cavity is made as an insert and comprises a porous part and preferably a back-up ring.

The disclosure made to this embodiment also applies to the other subject matters of the present invention and vice versa.

According to another inventive or preferred embodiment of the present invention, the porous part and/or the insert are placed from inside to the sidewall of the drum against a flange of the drum.

Since the drum is preferably hollow, the porous material or the insert comprising the porous material can be placed from inside to the sidewall of the drum and fixed in the desired position.

The disclosure made to this embodiment of the present invention also applies to the other inventive embodiments of the present invention and vice versa.

According to yet another preferred or inventive embodiment of the present invention, the drum comprises a recess for the porous part of the porous product cavities and/or for the insert, whereas the recess comprises support means for the porous part and/or the insert.

This embodiment of the present invention is particularly advantageous for large product cavities in order to avoid, that the porous material is damaged during its filling, emptying and/or cleaning.

The disclosure made to this embodiment also applies to the other embodiments and vice versa.

According to another or a preferred embodiment of the present invention, the cavities are provided as a porous insert, which is connected to the drum irreversibly, i.e. once connected, they cannot be removed from the drum without destroying the drum, the insert and/or their connection.

Preferably the insert is glued, welded, brazed and/or soldered to the drum.

The disclosure made to this embodiment also applies to the other embodiments and vice versa.

According to another preferred or inventive embodiment of the present invention, the drum comprises a multitude of, preferably essentially cylindrical, sidewall members, whereas one member is preferably a thin sheet member. The sidewall members are arranged concentrically and connected to each other. The thin sheet member is preferably a stainless steel sheet, which is extension- and/or shrink-fitted with another member, preferably a porous member of the drum. In another preferred embodiment, the thin sheet member is adhesively connected, preferably welded, soldered or brazed to another member, preferably a porous member.

The disclosure made to this embodiment of the present invention also applies to the other embodiments and vice versa.

According to another preferred or inventive embodiment of the present invention, a fluid channel and/or support means is part of the porous member or an insert, preferably a porous insert. The fluid channel and/or support means can be for example machined, drilled and/or milled into the porous material and/or the porous insert. The fluid channel preferably extends parallel to the center axis of the drum.

The disclosure made to this embodiment also applies to the other embodiments of the present invention and vice versa.

According to another preferred or inventive embodiment of the present invention, the drum comprises a multitude of fluid channels per row. These fluid channels preferably extend from one end to the other end, respectively and are preferably arranged in parallel, each preferably parallel to the center axis of the drum. These channels can be exposed to, for example compressed air to discharge a product and/or a cleaning fluid, simultaneously or sequentially. One or more fluid channels can be connected to the bottom and/or one or more fluid channels can be connected to the sidewall of the porous product cavity. By connecting at least one fluid channel to the sidewall and one to the bottom of the porous product cavity, the sequence of ejection of a fluid can be freely chosen. Pressurized fluid, for example air can be ejected firstly out of the bottom and then out of the sidewall of the porous product cavity or vice versa. It is also possible to eject a fluid out of the bottom and the sidewall of the porous product cavity, at least essentially simultaneously.

The disclosure made to this embodiment of the present invention also applies to the other embodiments and vice versa.

According to another preferred or inventive embodiment of the present invention, the sidewall and the bottom of the porous cavity have different flow-resistances regarding the fluid flow of the fluid to remove the formed food product from the product cavity.

The disclosure made to this embodiment of the present invention also applies to the other embodiments of the present invention and vice versa.

Due to the difference in the flow-resistance, it can be achieved that the amount of fluid, for example air, through the bottom and through the sidewall of the porous cavity can be different and/or that there is a phase shift between the discharge of the fluid at the bottom relative to the discharge of the fluid at the sidewall of the porous cavity. Preferably, the fluid discharge is firstly initiated at the sidewall and then at the bottom.

Preferably, the thicknesses of the porous material at the bottom differs from the thickness of the porous material at the sidewall. More preferably, the thickness of the porous material at the sidewall is thicker or thinner than the thickness of the porous material at the bottom of the porous cavity.

Alternatively or additionally, the surface of the porous material at the sidewall has a different, for example higher or lower, flow-resistance than the surface of the porous material at the bottom, particularly for the medium, for example air, that is utilized to eject the product from the porous cavity. More preferably, more pores on the surface of the porous material at the sidewall are closed than pores on the surface of the porous material at the bottom of the porous cavity or vice versa.

According to yet another preferred or inventive embodiment of the present invention, the thickness of the porous material varies within the bottom and/or within the sidewall. This embodiment of the present invention allows to influence the flow distribution for example of the discharging- and/or the cleaning fluid along the bottom and/or the sidewall.

The disclosure made to this embodiment of the present invention also applies to the other embodiments and vice versa.

According to another preferred or inventive embodiment of the present invention, the drum comprises a multitude of sidewall members whereas preferably the inner member or intermediate member is entirely a porous member. The sidewall members are preferably arranged concentrically.

The disclosure made to this embodiment of the present invention also applies to the other embodiments and vice versa.

According to another preferred or inventive embodiment of the present invention, the porous product cavity is made as an insert and secured to the drum by a sidewall member. The sidewall member preferably has a cylindrical shape.

The disclosure made to this embodiment of the present invention also applies to the other embodiments and vice versa.

According to yet another preferred or inventive embodiment of the present invention, the drum is at least partially casted. This embodiment of the present invention simplifies the production of the drum, because, for example, the fluid channels need not be machined into the drum.

The disclosure made to this embodiment of the present invention also applies to the other embodiments of the present invention and vice versa.

According to another inventive or preferred embodiment of the present invention, the volume of each product cavities is smaller than the desired volume of the product.

The disclosure made of this embodiment of the present invention also applies to the other embodiments of the present invention and vice versa.

In another inventive or preferred embodiment of the present invention, each fluid passage is, at its ends, covered with a cover, which disconnects each fluid passage from a fluid supply, whereas this cover comprises a recess and/or is pivotable. With this cover, the fluid supply to the fluid passages can be controlled.

The disclosure made of this embodiment of the present invention also applies to the other embodiments of the present invention and vice versa.

Another preferred or inventive embodiment of the present invention is a process for the manufacturing of the drum, whereas the outer diameter of the drum will be provided slightly larger than the desired final diameter of the drum, the porous inserts are placed in the sidewall of the drum and the sidewall of the drum then the drum gets it final diameter by, for example machining, preferably milling the surface of the drum. During this machining, the pores on the surface of the porous inserts facing the outer circumference of the drum are at least partially closed.

The disclosure made to this embodiment of the present invention also applies to the other embodiments and vice versa.

Another preferred or inventive embodiment of the present invention is a process for manufacturing the drum, whereas the porous material of the porous product cavities is deposited in the sidewall of the drum.

The disclosure made to this embodiment of the present invention also applies to the other embodiments and vice versa.

Before securing a porous insert in a drum, it is preferred to close the pores of the porous insert in certain surface-areas, particularly in the contact area between the porous insert and the drum, at least partially. The closure can be accomplished by grinding or laser-polishing, this area, coating the area, for example with a molten metal, and adhesive such as epoxy, laserpolishing or by soldering. Preferably, the pores will be close by blasting or shot-peening. During shot-peening, the porous surface is impacted with shots of particles, for example ceramic particles. The surface of the porous material, which is subjected to blasting or shot-peeling deforms plastically so that the pores on the surface are closed at least partially. Another preferred method to close the pores on the surface of the porous material is impregnation, particularly vacuum-impregnation for example with a resin. Preferably, the surface of the porous material is treated by electropolishing for example to achieve a smoother surface and a reduced product adhesion.

All subject matters of preferred and inventive embodiments of the present invention can be combined in new claims.

Removing of the formed products out of product cavities can be done in several ways.

In case the product cavities are only provided with a porous bottom, fluid will only to be provided in a passage which is directed to the porous bottom. In case the product cavities are provided with a porous bottom and a porous sidewall fluid has to be provided to both the bottom wall and sidewalls.

Several options are possible:
1—Fluid can enter the product cavity via the porous structure of the bottom wall and sidewalls at the same moment
2—Fluid can enter the product cavity first via the porous structure of the sidewalls and some time later via the porous structure of the bottom wall.
3—Fluid can enter the product cavity first via the porous structure of the bottom wall and some time later via the porous structure of the sidewalls.

Preferably or according to another inventive concept, each insert is sintered, preferably from a metal material. Each insert is fixed, preferably by an adhesive connection, to the drum. More preferably, each insert is soldered to the drum. Preferably, each insert extends, at least essentially, over the entire length of the drum. More preferably, the drum comprises an end cap, more preferably at each end. Each end cap is preferably designed as a circular ring. The end cap is connected to the drum by a form- and/or force-fit, more preferably screwed to the drum.

Preferably, the drum comprises at least one groove per row of cavities, which extends over the entire lengths of the drum. Preferably, the cross section of the groove is dove tailed. One or more Inserts with a corresponding diameter, preferably one insert per product cavity or one insert per row, can be inserted from a frontend, preferably each frontend, into the groove. The inserts are at least partially made from a porous material and the cross section is shaped such, that there is a form-fit between the groove and each insert, respectively, due to the dove tailed cross section. Preferably, the inserts are connected to the drum by an adhesive connection, more preferably soldering, welding or brazing. Each insert can also be fixed to the drum by a form-force- and/or friction-fit. Alternatively or additionally, each row comprises one or more pressure elements, which, for example, pushes the inserts towards the circumference of the drum and thus reduces the gap between the insert and the surface of the drum. The gap between the insert and the drum can be closed as disclosed above. One or more fluid passage(s) is/are provided between the insert and drum. The joint length of all inserts in one row is preferably longer than the longitude extension of the drum. After the inserts have been placed into the drum, the inserts can be pressed together and/or against the drum by means of one or more pressure element(s) and one or two end cap(s) is/are provided at least at one front-end of the drum.

Preferably only one insert per row is provided which comprises all product cavities of this row respectively.

However, it is also possible to have a multitude of inserts per row, whereas each insert may comprise more than one cavity.

Preferably, the drum comprises a essentially cylindrical inner member with grooves for at least one, preferably a multitude of inserts. Preferably each insert is sintered, preferably from a metal material. Each insert is fixed, preferably by an adhesive connection, to the drum. More preferably, each insert is soldered to the drum. Preferably, each insert extends, at least essentially, over the entire length of the drum. More preferably, the drum comprises an end cap, more preferably at each end. Each end cap is preferably designed as a circular ring. The end cap is connected to the drum preferably by a form- and/or force-fit, more preferably screwed to the drum.

In the following several embodiments will be described to control the flow of fluid in such way that fluid will enter the product cavity first via the bottom wall and then the sidewalls or first via the sidewalls and then the bottom wall.

The inventions are now explained in further detail according to the subsequent figures. This disclosure does not limit the scope of protection of the present invention. The descriptions apply to all embodiments of the present invention, respectively.

DETAILED DESCRIPTION

Figure 1:
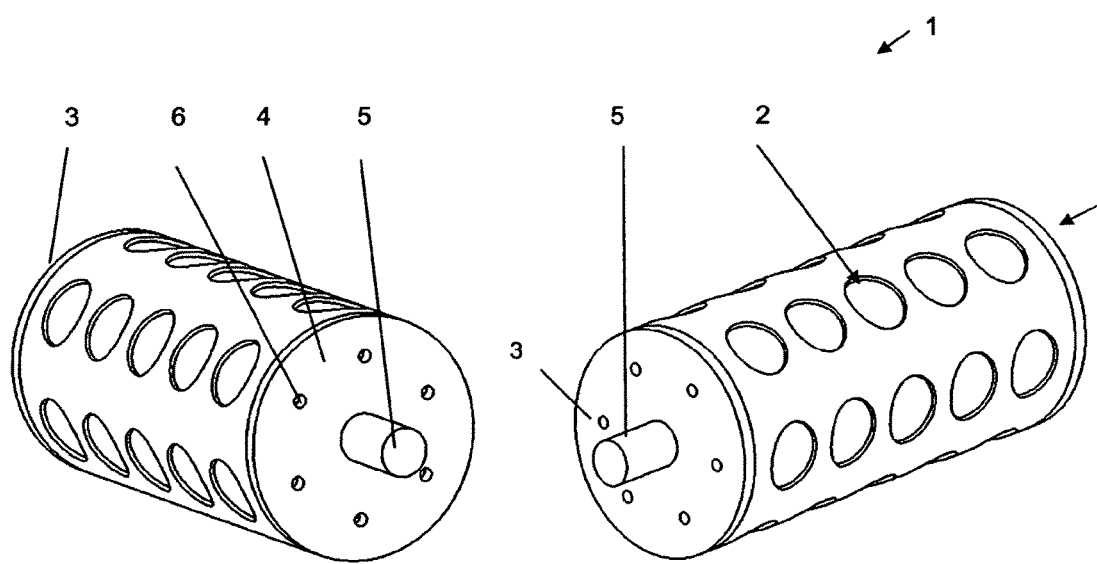
FIG. 1 shows the inventive food forming drum.

FIG. 1 shows the inventive food forming drum, which is part of a food forming apparatus, which forms a food mass into a food product for example a patty. Along its circumference, the drum 1 comprises a multitude of rows 8 of cavities 2. In the present case, one row comprises five cavities 2. In each cavity 2 a product can be formed. During the forming of the food products, the drum rotates so that in one position, the cavities 2 in one row 8 are filled, while downstream from this position, the food products in a row are discharged from the cavities. Preferably the drum is hollow and comprises at its first front end 3 and its second front end 4 an end-cap 7, respectively. At least one fluid channel 6 per row 8 extends over the entire length of row 8 and including both end caps 7. This longitudinal channel 6 is, as later described in further detail, connected fluid-wise to each product cavity 2 in one row, in order to vent these cavities during their filling, to force a fluid through the cavities to discharge the formed product and/or to force a cleaning fluid through the cavities. In order to bear the drum rotatably in the forming apparatus and/or in a cleaning apparatus, the first front end 3 and the second front end 4 each can comprise a journal 5 connected to the frond ends 3, 4, respectively. However, the inventive drum can also comprise a long shaft over the entire length of the drum, which extends out of the front ends 3, 4, respectively. Other bearing solutions are possible, too.

According to the present invention, the product cavities 2 are at least partially made from a porous material which is permeable for a fluid, for example a gas and/or a cleaning fluid. Via the porous section of the product cavity, the product cavity can be vented during filling and the formed product can be loosened from the product cavity by means of ejecting gas. The porous material is preferably a sintered material. The porous material can be an entire circumferential layer/member of the drum, into which the product cavity 2 is preferably machined. Alternatively, the porous part of the product cavity can be provided as an insert. In this case, the drum preferably comprises one or more, preferably stainless steel members, each preferably provided as a tube, which are connected together. The porous material will be provided as an insert, which will be fixed to the drum.

Figure 2:
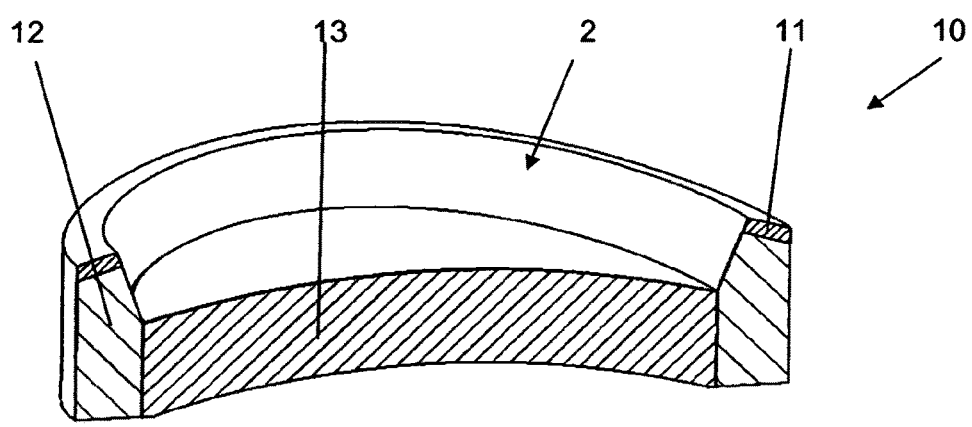
FIG. 2 shows an embodiment of an insert.

FIG. 2 shows a first embodiment of such an insert 10. This insert 10 comprises a porous bottom 13 and a porous sidewall 12, whereas the porosity of the sidewall and the bottom can differ. The surface of the sidewall 12 and the bottom 13 define the product cavity 2, in which the food mass is formed into the desired shape, here a disk. The inner surface of the sidewall 12 is, at least partially, slightly conical in order to simplify the discharge of the product. At its top surface, the sidewall comprises a closed region 11, to avoid air leakage in this region during the discharge of the product with compressed gas, for example air and/or for hygienic reasons. The porous part of the insert 10 can be made from a piece of commercially available porous material. The person skilled in the art understands, that the porosity of the bottom and the sidewall can also be identical. The insert can also be made by rapid prototyping; i.e. by 3D-printing of a molten metal powder. Layers with different porosity and/or layers which are not porous can be created in this way. In the example according to FIG. 2, insert 10 is provided with a sidewall with porosity A, a bottom with porosity B and a region 11 with no porosity.

Figure 3:
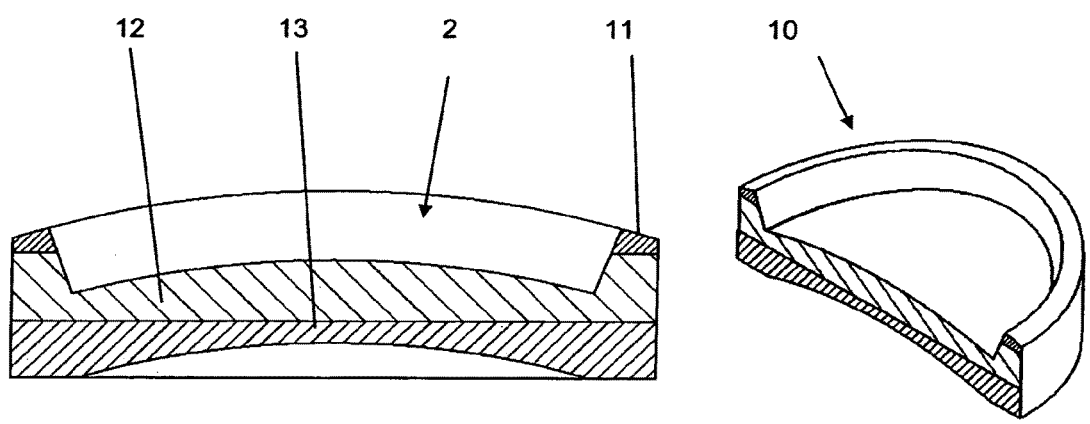
FIG. 3 shows another embodiment of an insert.

FIG. 3 shows yet another embodiment of the insert 10. In the present example, the insert 10 is sintered and build up in layer 12, 13 with different porosity. The layers 12, 13 can also be prefabricated and then attached to each other. In the present example, the bottom part 13 has a larger porosity (i.e. less mass per volume) than layer 12 in order to reduce the air flow resistance of this layer. The layer 12, which is in contact with the food mass to be formed preferably has a lower porosity (i.e. more mass per volume) than layer 13, to avoid or reduce penetration of the food mass into the porous layer. The top layer 11 is for example not porous at all. As can be also seen from this example, the thickness of the entire porous part and/or the thickness of the individual layers can vary over the extension of the product cavity to direct the fluid flow to discharge the product from the cavity and/or the cleaning fluid into desired regions of the product cavity. It can be for example desirable, to have a higher air flow at the outer region of the bottom and/or along the sidewalls to loosen the formed product in this region. However, a uniform flow-pattern over the entire bottom and/or the sidewall can also be desirable.

Figure 4:
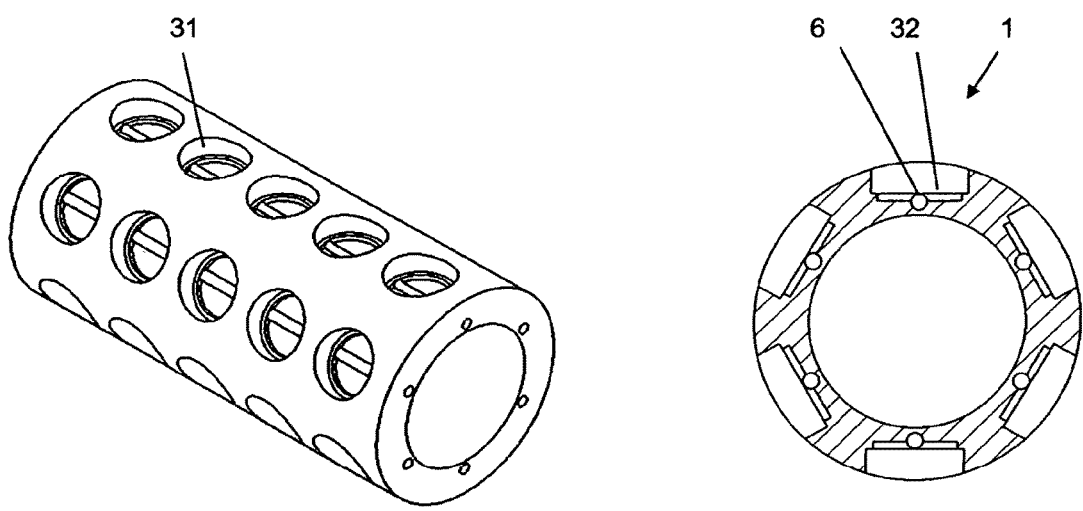
FIG. 4 shows the recesses and the fluid channel of the drum.

In FIG. 4 the manufacturing of the drum 1 is depicted. Preferably, the drum is made from a commercially available thick-walled tube, preferably a stainless steel tube. This tube is preferably provides with a slightly larger diameter than the desired final diameter of the drum 1. Subsequently, recesses 31 for the insert 10 or the porous material are machined into the drum, where later on a product cavity 2 will be placed. Simultaneously afterwards or before the longitudinal channel 6 can be machined for example drilled into the drum, from one end of the drum to the other end, whereas one row of recesses (here five recesses) is provided with at least one longitudinal channel 6. Via this channel 6, the product cavities 2 will be later vented, provided with a compressed gas to discharge the product and/or with a cleaning fluid to clean the passage 6 and/or the product cavities 2. The fluid channel 6 extends from one and of the drum to the other front end of the drum. All other holes and recesses, for example for connecting the end-caps to the drum, can be provided too. The person skilled in the art understands, that the drum can also be made by casting. In this case, at least some channels and other holes needed are preferably part of the cast. This preferred embodiment of the present invention has the advantage, that the subsequent machining is at least reduced.

In the next step, each insert, which comprises at least partially porous material, will be placed in one recess of the drum, respectively and fixed in this position. The fixation of the insert and/or the porous material itself in the drum will be explained later on. In a following step, the drum gets preferably its final desired diameter. During this step, the top surface of the inserts can be closed, if desired. In the next step, if not already carried out, the product cavities can be machined into the porous inserts. This can be for example done by milling, whereas the tool needs a sharp cutting edge. Preferably the removal of porous material will be done by EDM. When the product cavities are inserted into the drum, in a lot of cases, the final weight of the formed product is too large. A correct final weight of the formed product can be achieved by making the diameter of the drum slightly smaller, for example by reducing the diameter of the drum after the inserts have been inserted into the drum. The end-caps 7 are preferably bolted to the tube and have sealing to prevent that meat particles and/or cleaning fluid enters the drum assembly. Depending on the design it is also possible to bolt the end-caps to the drum before placing the inserts into the sidewall of the drum. The drum is a component of a forming apparatus which will be exchanged regularly for example for cleaning-purposes. Therefore a light weight drum is desired. The strength and stiffness in combination with al low weight of the drum can be optimized, by example by using a central axis which extends at least over the entire length of the tube. Additionally, the tube 1 can comprise reinforcement means, for example reinforcement rings at its inner surface. The drum is preferably made from stainless steel. To minimize wear of the surface of the drum during production of the formed products, it is recommended that the outer surface of the drum has a high wear resistance.

Figure 5:
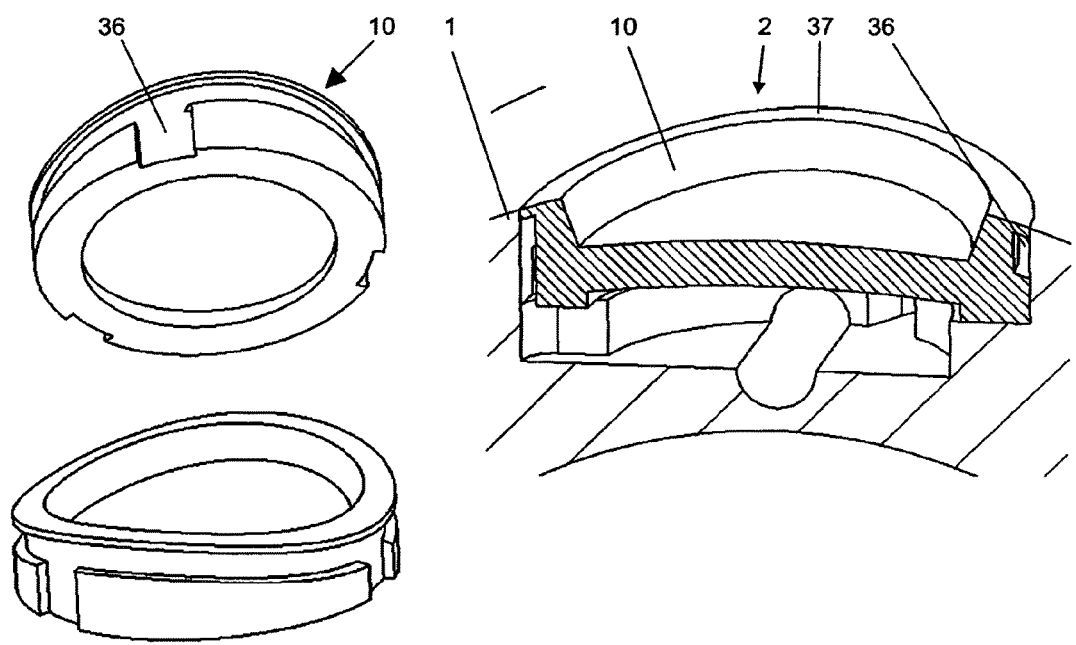
FIGS. 5-7 shows different embodiments of the insert.

FIG. 5 shows an example of a porous insert 10, which can be directly placed into the drum. The top surface of the bottom and the inner surface of the sidewall define the product cavity 2. Around its circumference, the porous insert has optionally a circumferential fluid channel 36. Via this fluid channel 36 gas can be forced through the porous sidewall, to loosen the formed product from the sidewall, and/or a cleaning fluid can be provided to the sidewall. The circumferential channel 36 is connected to the main fluid passage 6 via horizontal fluid connections (here three fluid connections).

Figure 6:
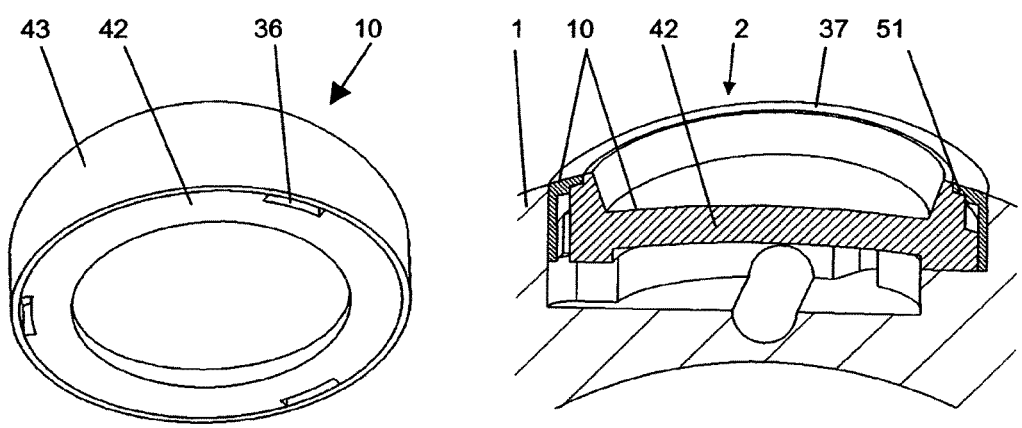

FIG. 6 shows yet another embodiment of the insert 10. Essentially, this insert 10 is designed as the insert according to FIG. 5. However, in the present case, the porous part 42 is covered by a cover 43, here a back-up ring. Thus, the insert 10 comprises two parts 42 and 43. The back-up ring 43 extends around the entire circumference of the porous part 42 and has additionally a contact surface 51 at the top the of the porous part 42. As already explained above, the channel 36, machined in the porous part 42, is optional.

Figure 7:
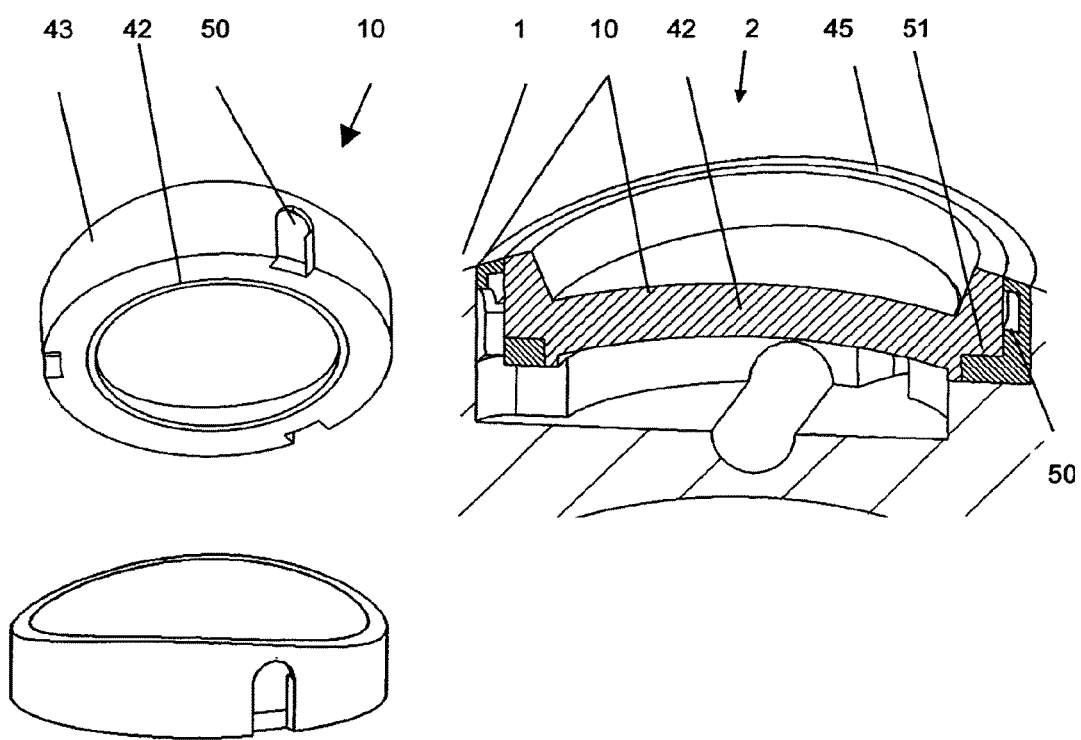

FIG. 7 shows yet another embodiment of the insert 10. Again, the insert 10 has, a porous part 42 and a back-up ring 43. In the present case, this back-up ring comprises fluid channels 50, which are however again optional. In contrast to the embodiment according to FIG. 6, in the embodiment according to FIG. 7, besides the circumferential connection between the back-up ring 43 and the porous insert 42, there is a contact surface 51 at the bottom of the porous part 42.

In case that only a porous material is inserted into the recess of the drum, this porous insert 10 has to be tightly fitted into the recess to prevent loosening or disconnection of the porous material from the drum 1 during production or cleaning. In cases where the porous material 42 is covered by a cover of a back-up ring 43, a close connection is needed between the porous material 42 and the back-up ring 43 and particularly between the back-up ring and the drum. All connections have to be so tight that no gaps, into which the food mass can penetrate, are existent. In case gaps are present, they have to closes by means described below.

All materials used in connection with the drum have to be approved for use in the food-industry.

Means how to secure the insert in the drum is now explained in further detail.

In general, the insert 10 can be pressed into the recess of the drum. In case, that the insert to be pressed is only a porous part 42, the pores of the porous material can be partially closed and porosity will be lost. Thus, a press connection of the porous part is only an alternative in case no air flow is desired in the deformed porous part.

Alternatively or additionally, the insert can be shrink-connected with the drum. In this case the insert 10 particularly the porous part 42 is cooled down and then can be placed in a back-up ring 43 or directly in the recess of the drum. Mounting tension is thus largely avoided. The tightest fit can be achieved by a combination of shrinking the insert and heating the drum and/or the back-up ring. The person skilled in the art understands, that the same technique can be used to assemble the entire insert 10, comprising a porous section 42 and a cover 43, in the drum.

Figure 8:
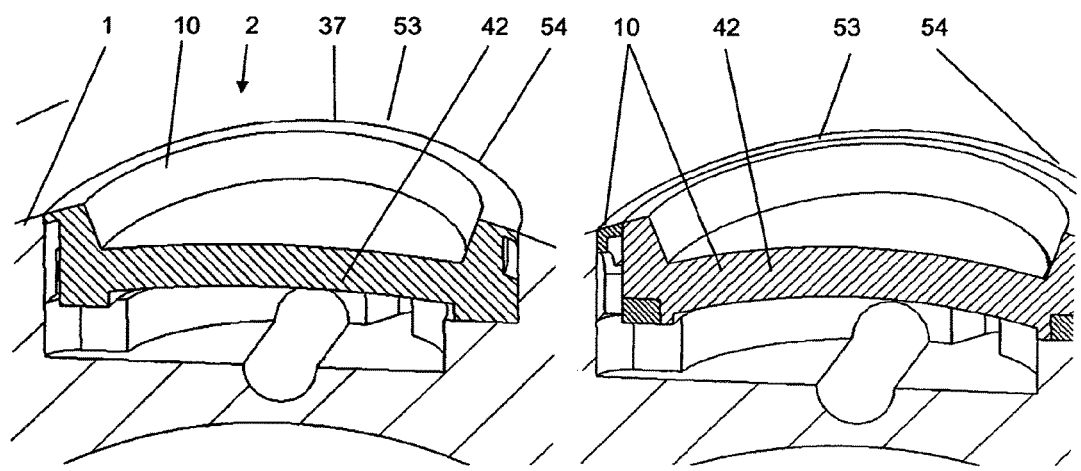
FIGS. 8-11 shows the fixation of the insert in the drum.

As depicted in FIG. 8, the insert 10, including a cover 43 or not, can be welded or brazed (compare reference sign 54) to a recess of a drum and/or the porous part 42 and the back-up ring can be welded or brazed together as depicted by reference signs 53. Welding/Brazing line 54 is optional, in case a shrink and/or press connection exists between the insert and the drum. The Welding/Brazing is preferably carried out by laser-welding, laser-brazing. The laser is preferably moved in a pre-programmed pass with a relatively low heat transfer. Welding/Brazing technique can also be utilized to close pores of the porous material, for example at the area around the Welding/Brazing line. By closing the porous, the porosity disappears and the solid piece of metal is created which is less sensitive during Welding/Brazing and which cannot be penetrated by a gas.

Figure 9:
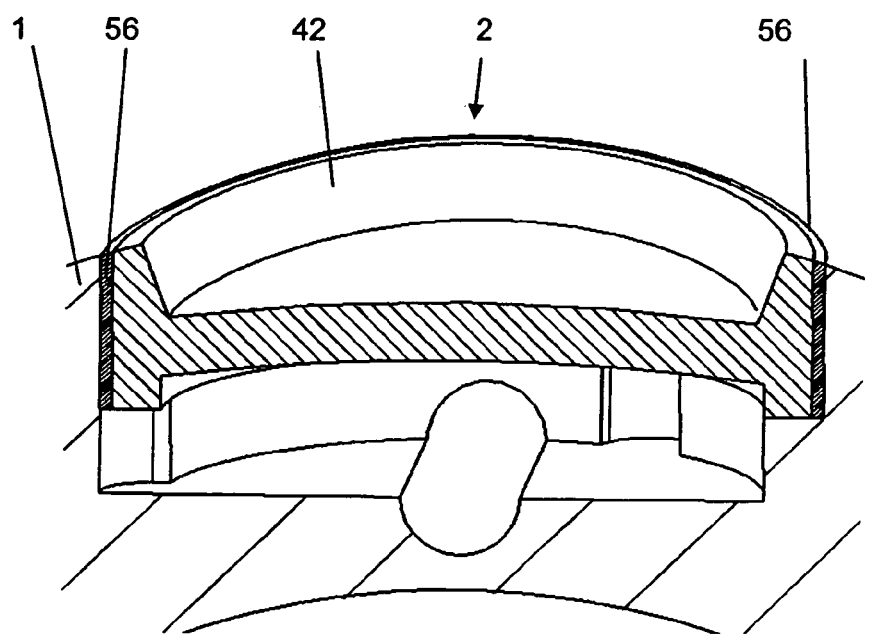

FIG. 9 shows an embodiment of the present invention, where the porous material 42 is soldered to a cover/back-up ring and/or directly to a recess of the drum. The person skilled in the art understands, that the back-up ring can also be soldered to the drum. In the present case, the porous insert 42 is placed into a recess of the drum. To assure a, preferably constant, gap between the circumference of the insert and the recess, the circumference of the porous part 42 of the insert and/or the insert 10 itself will be provided with ridges. The assembly of drum 1 and insert 10, 42 will be preferably heated and when the desired temperature is achieved, heated solder 56 will be applied. Entrapped air can escape via the porous structure. The porous material of the insert will soak up the flux and solder. After the inserts 10, 42 are placed and secured in the drum, the drum can be machined to its final diameter.

Figure 10:
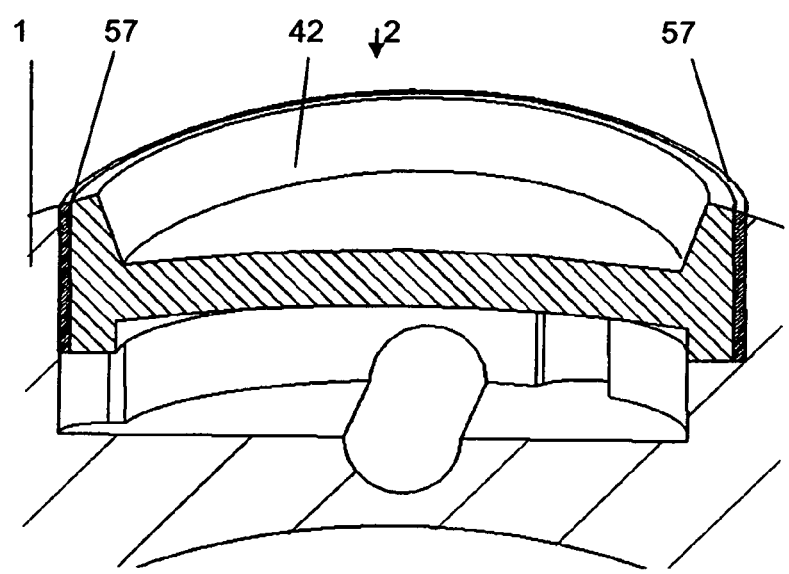

In the embodiment according to FIG. 10, the solder is replaced by a bonding agent for example a glue.

Figure 11:
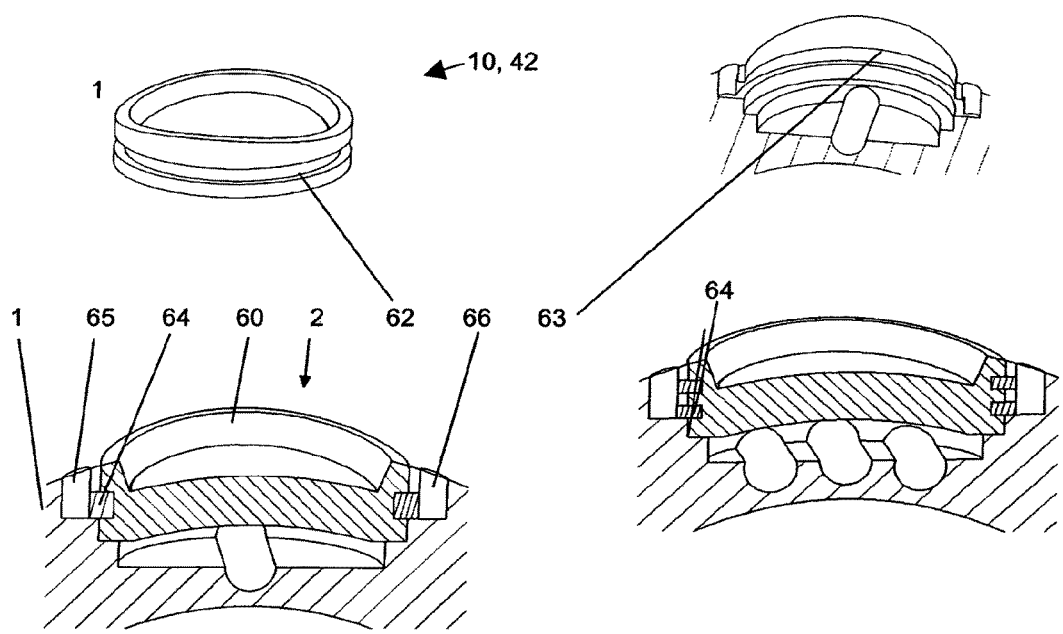

In the embodiment according to FIG. 11 the inserts 10 and/or the porous part 42 is secured to the recess of the drum with an epoxy, preferably a stainless steel epoxy. In case the insert 10 comprises a porous part 43 and a cover/back-up-ring, the porous part 42 and the back-up ring 43 can also be secured to each other by epoxy. In the present case, the epoxy is supplied at a supply point 65 and then flows into the distribution channels 62, 63, where it spreads around the entire circumference of the porous material 42 or the insert 10. Depending on the viscosity of the epoxy it will also penetrate over a certain depths into the porous material. One of the distribution channels 62, 63 is, in the present case, a groove around the circumference and the other one can be a number of recesses or a groove too. An epoxy bridge(s) 64 is thereby created. The entrapped air will escape via the porous structure of the insert. Once the epoxy escapes via discharge point 66, the supply can be stopped. To ensure that no epoxy can escape, the supply point 65 and the discharge point 66 can be provided with a sealing plug.

The epoxy can be replaced by molten metal or a molten alloy. Whereas the metal or the alloy is preferably a material with a low melting point.

Figure 12:
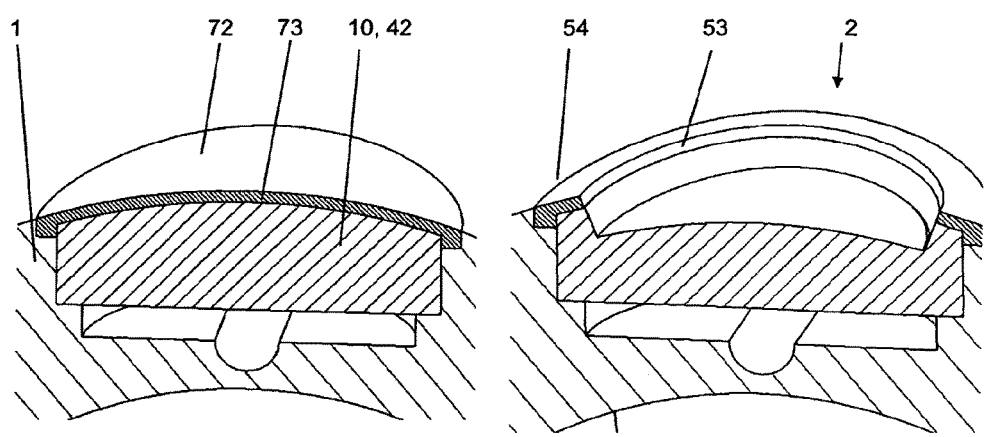
FIG. 12 shows an insert with a cover.

FIG. 12 shows an application with a cover 72. After the porous insert 10, 42 has been placed in the recess of a drum 1 and is preferably connected to the drum for example via a shrink connection, it can be further secured with a cover 72. The cover is fitted tightly in the recess of a drum and can be secured in the recess as described above. After all inserts are placed and secure in their cavity respectively, the drum can be machined to its final diameter.

Figure 13:
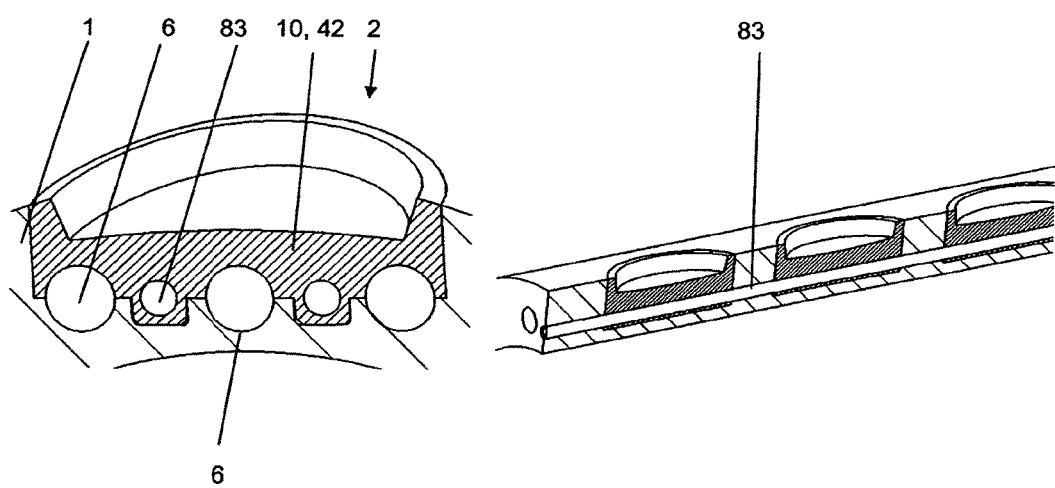
FIG. 13 shows the fixation of the insert with a locking pin.

FIG. 13 shows the fixation of the insert 10, 42 via a locking pin. After the insert 10, 42 is placed in a recess of the drum and is preferably fixed, for example with a shrink connection and preferably joints and cracks are sealed as described above, a hole is drilled preferably over the entire longitudinal length of the drum. A pin 83 is then inserted into the hole so that the inserts 10, 42 are locked tight fitted in the drum. If needed, the drum can then be machined to its final diameter.

Figure 14:
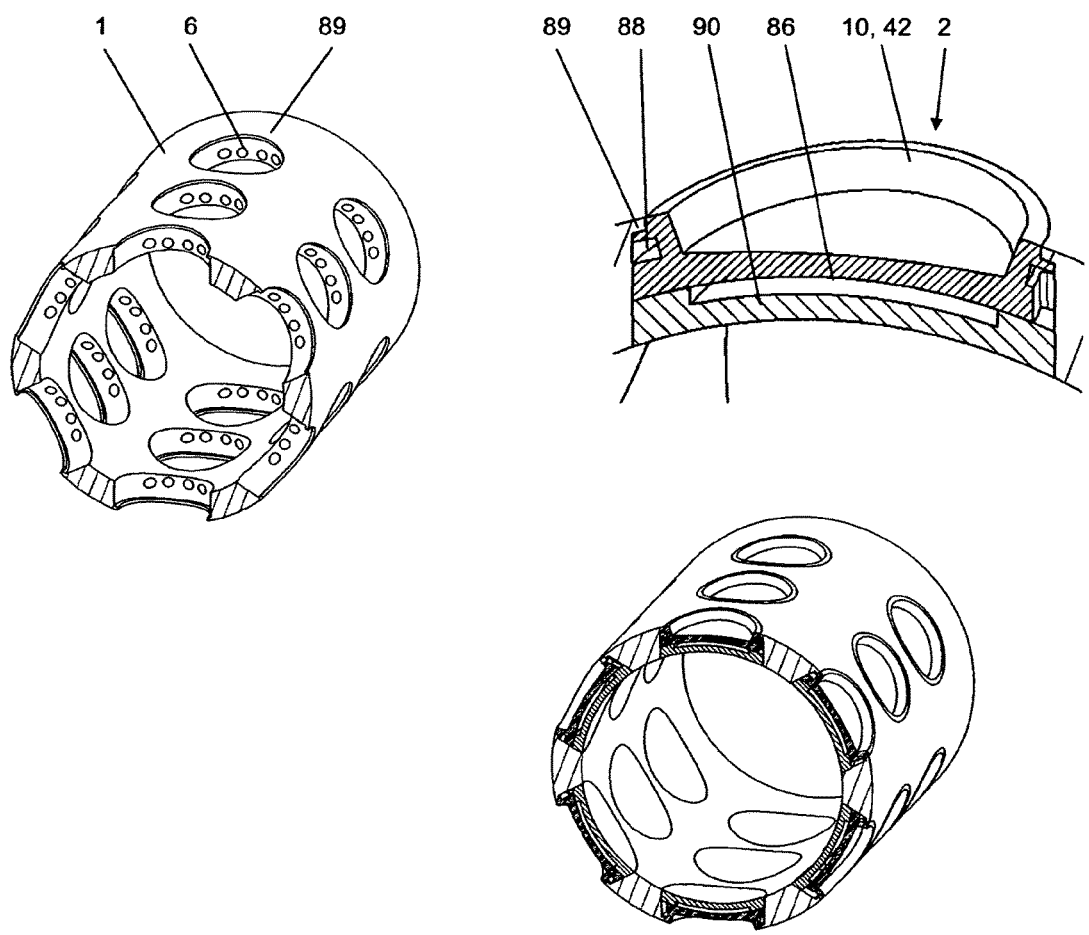
FIGS. 14-15 shows the fixation of the insert with a locking piece.

FIG. 14 shows yet another process how to assemble the inventive forming drum. In the present case, the insert 10, 42 is placed from the inside into the sidewall of the drum, against a flange 89 machined or casted into the sidewall of the drum. The insert 10, 42 is then secured in this position by a locking piece 90, which is also inserted from inside and then fixed to the drum via the above described mechanisms.

Figure 15:
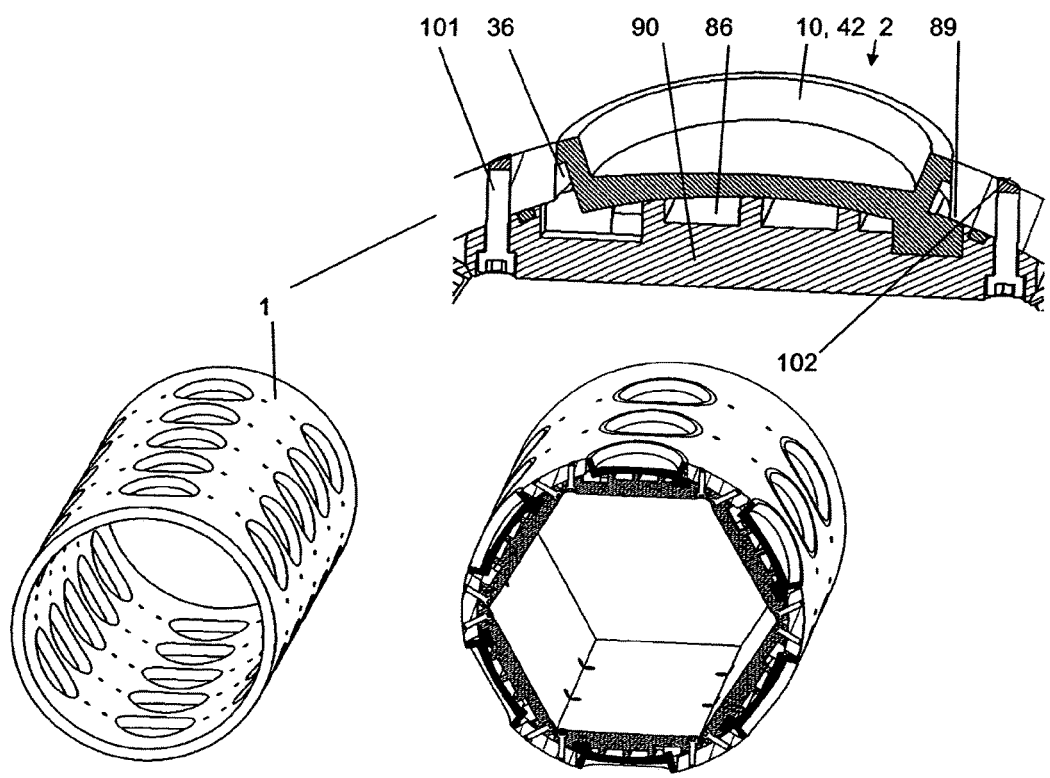

In the embodiment according to FIG. 15, the insert 10, 42 is also placed from the inside against the sidewall of the drum, whereas in the present case, the insert 10,42 comprises a flange 89, preferably in the vicinity of its bottom, which lies against the inner diameter of the sidewall of the drum. The insert 10,42 is secured in this position via a locking piece 90, which is in the present case screwed to the drum by screws 101. The top of the screws can be covered with a cover 102 to provide a smooth surface of the drum. The fluid channels 86 are, in the present case, machined into the locking piece. It can further be seen, that in the present case there are a multitude of parallel fluid passages 86.

Figure 16:
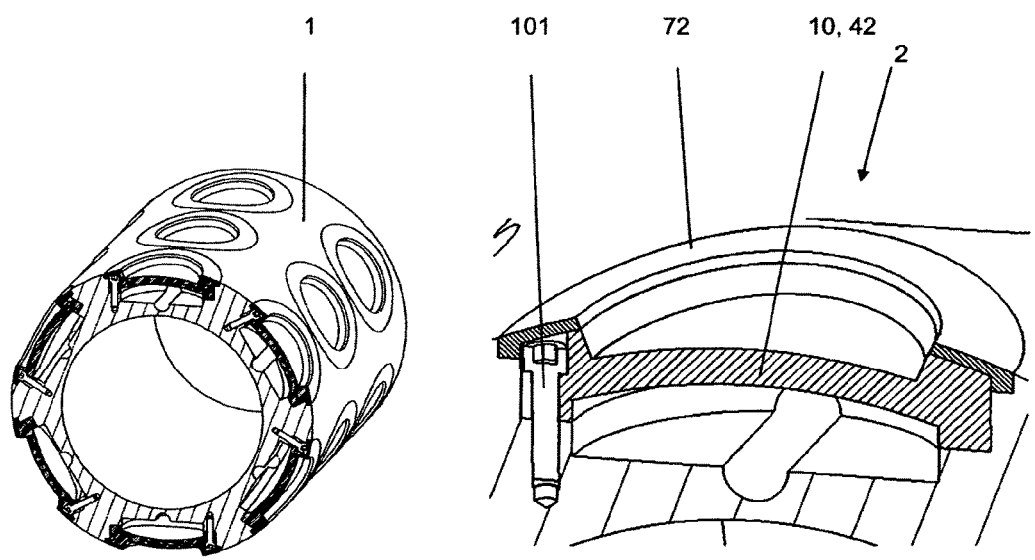
FIGS. 16-18 shows the attachment of the insert to the drum with a mechanical fastener.

FIG. 16 shows yet another solution how to fix the insert 10, 42 particularly the porous part 42 of the insert to the drum. This is in the present case achieved by screws 101. These screws are subsequently covered with a cover 72 which also closes the top surface of the porous material 42. Gaps between the porous material and the drum, the porous material and the cover and the cover and the drum can be closed as described above. In the present case, no fluid channels are provided at the circumference of the porous part 42. However, they can be inserted if needed.

Figure 17:
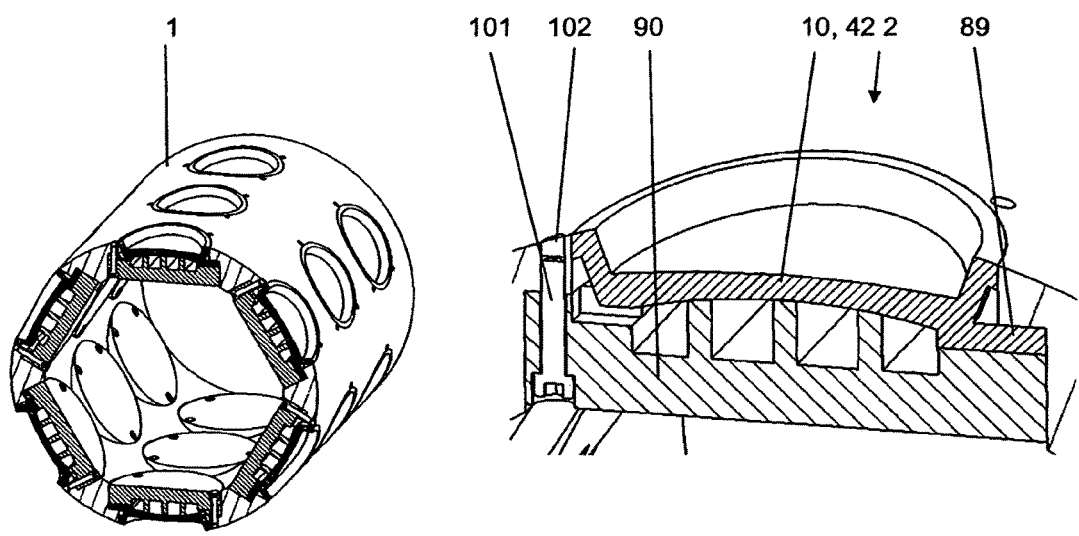

FIG. 17 shows yet another embodiment of the inventive drum. In the present case the insert 10, particularly the porous insert 42 will be placed from the inside of the drum in a recess whereas its flange 89 lies against a flange, machined into the sidewall of the drum. A locking piece 90 secures the insert 10, 42 in the drum. The locking piece itself is secured to the drum via screws 101. The hole of the screws can be closed with closing means 102.

Figure 18:
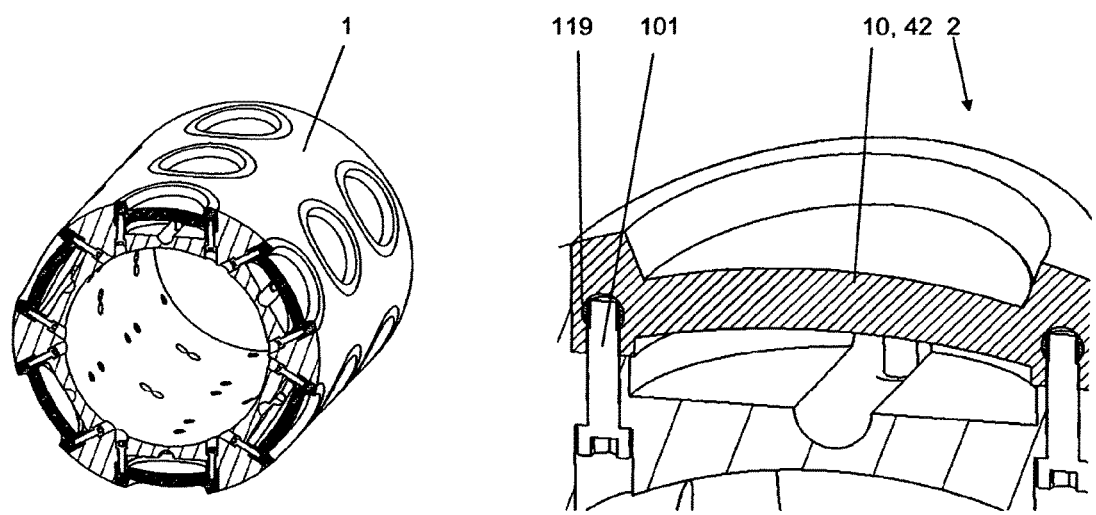

FIG. 18 shows yet another embodiment of the present invention. In the present case, the insert 10, 42 is directly screwed to the drum with screws 101. In the present case, the porous material preferably comprises an insert 119 which comprises the thread for the screw.

The person in the skilled in the art understands that all means to secure the inserts 10, 42 in the drum can be combined. It is particularly preferable to close all gaps and joints by welding, brazing and/or gluing.

Figure 19:
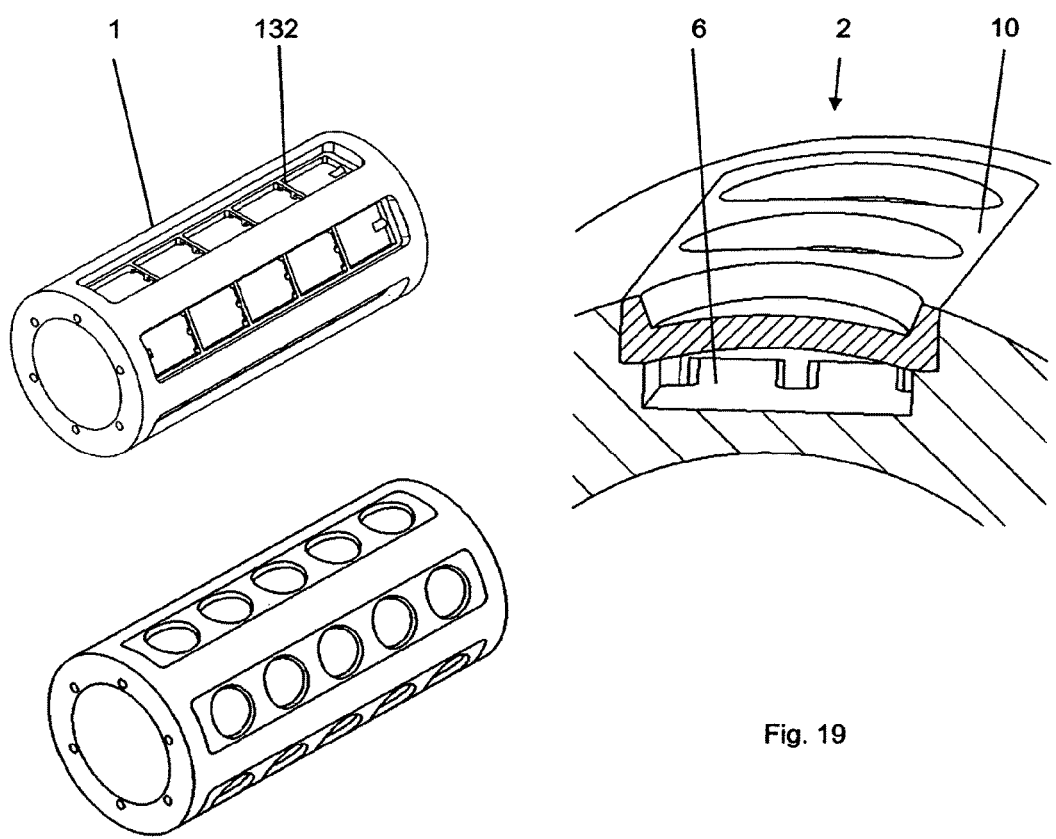
FIG. 19 shows a support rib when using one single insert.

In the embodiment according to FIG. 19, the product cavities 2 of one row 8 are not provided as individual inserts 10, 42 but at least two product cavities, preferably the entire row of cavities, is provided by one single insert 10. This insert is preferably made at least partially out of the porous material. Support means, here a rib 132, here provided with a fluid passage 6, is located between two product cavities, respectively in order to support the insert 10,42. Bonding and sealing can be utilized as described above. The support means 132 can also extend in a different direction, for example parallel to the longitudinal middle axis of the drum. The single insert 10 will be fixed in the drum and is not exchangeable.

In an alternative design as depicted in the subsequent figures, the tube is not made from one member but a multitude of members.

Figure 20:
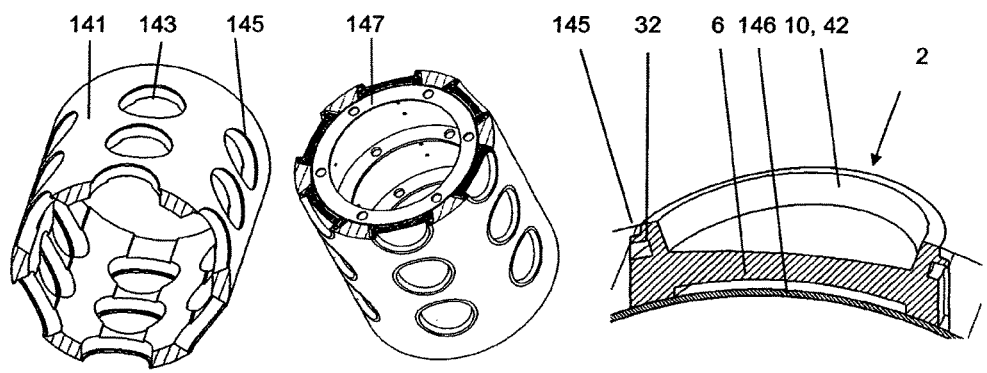
FIGS. 20-23 show a tube with a multitude of wall numbers.

FIG. 20 shows an embodiment of the tube with an outer member 141, here a thick walled tube and an inner member 146, here a thin walled member. The inserts 10,42 are placed from the inside into the outer member 141 whereas a flange 145 lies against a flange of the outer member 141. The insert 10, 42 is secured in its position by an inner member 146 which is in the present case a rolled sheet metal plate. The inner member is preferably secured in its position by a weld with the outer member. The person skilled in the art understands that the inner member can also be secured to the outer member by other means, for example friction-fit or the like. If needed, reinforcement means 147, here rings, can be provided. The fluid passage 6 is in the present case located between a recess in the insert 10, 42, a recess in the outer member 141 and the inner member 146 as can be particularly seen the left hand and right hand picture of FIG. 20.

Figure 21:
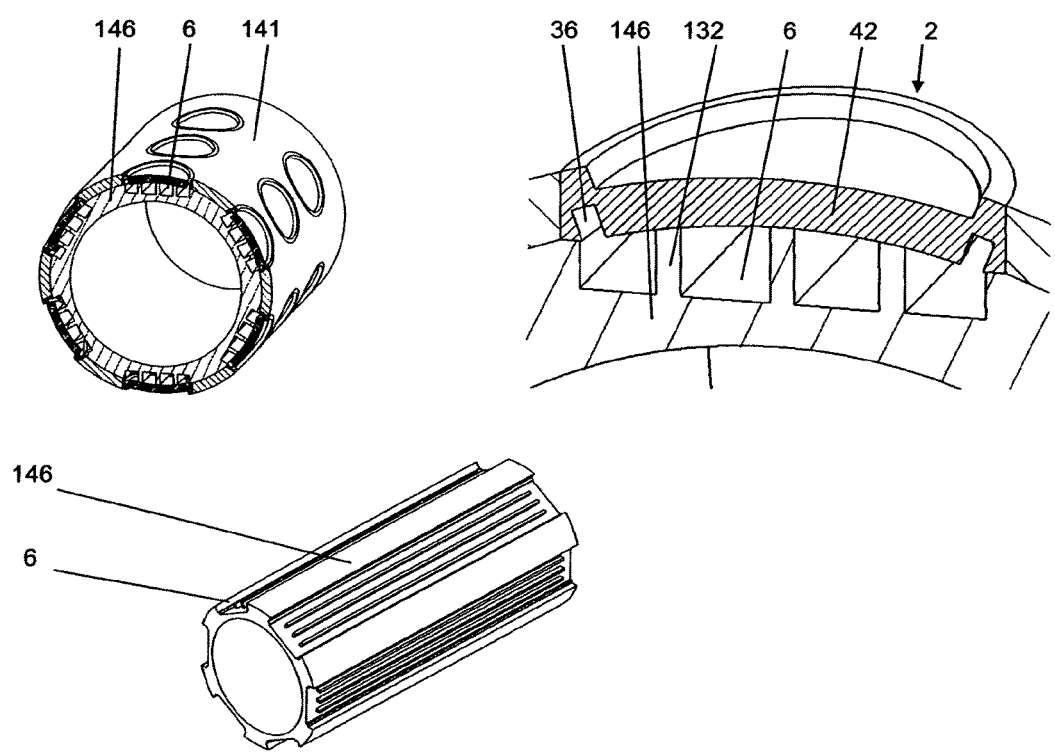

FIG. 21 shows also an embodiment of the drum with two coaxial sidewalls, members. In the present case, the drum comprises a relatively thick inner wall member 146 and a relatively thick outer wall member 141. The two wall members can be connected via a shrink connection, for example. Porous inserts 42 are placed in a recess of the outer member and against the inner member. Fluid passages 6 are, in the present case, machined into the inner member whereas also in the present case a multitude of parallel fluid passages 6, which extend over the entire lengths of the tube, are provided. The embodiment according to the present invention also comprises support means 132, here ribs, here between two channels, which support the porous structure mechanically. The porous insert 42 further comprises a fluid channel 36 through which a air and/or a cleaning fluid flows during production and/or cleaning of the insert 42.

Figure 22:
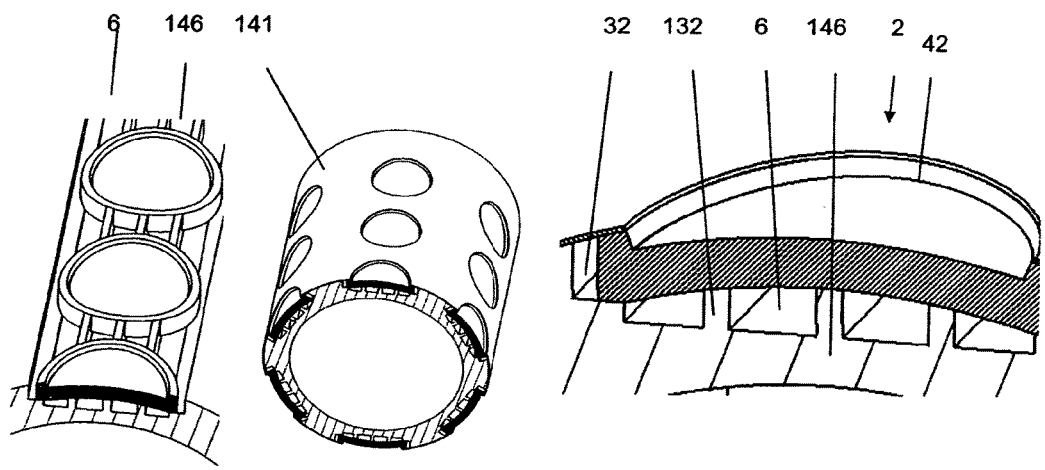

FIG. 22 shows yet another embodiment of the inventive tube. In the present case, a porous insert 42 is placed in a recess in the inner wall member 146, here a thick walled tube. Then, the outer member 141, here a rolled sheet metal plate, will be placed around the inner member. During the fixation process for example a welding process the outer member will be shrunk tight around the inner member and the insert is secured at least in the radial direction, in this case. Four fluid channels 6 extend underneath the insert from one front end to the other front end of the drum. Via these channels, a part of the air flows during production to the fluid channels around the insert as depicted by reference number 32, which directs the fluid to the sidewall of the cavity 2. During cleaning, cleaning-fluid flows through all channels 6, 32 and cleans the channels.

Figure 23:
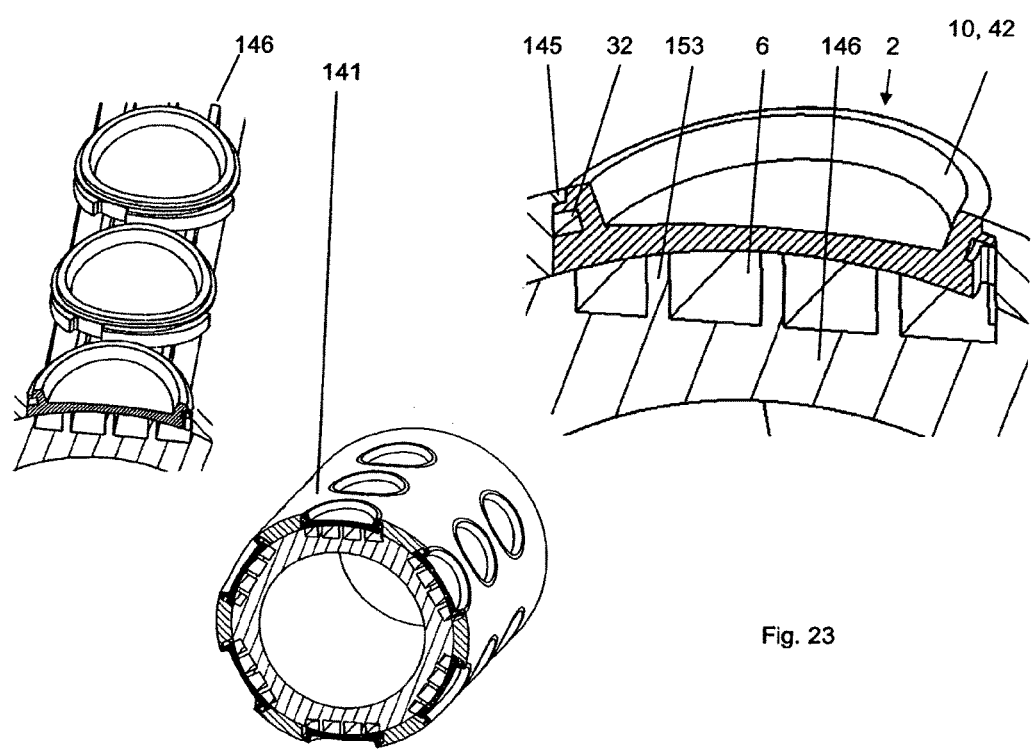

FIG. 23 shows yet another embodiment of the present invention. In the present case, a porous insert 10, 42 will be placed from the inside in the outer member 141, here a relatively thick walled tube, in a recess of the outer member against a flange 145. Then the inner member a relatively thick walled tube will be places into the outer tube and fixed in the position. This can be done for example via a shrink connection. By using two relatively thick members, the drum will be stiff enough to absorb the forces during production and cleaning. Regarding the fluid channels 6, reference is made to the disclosure according to FIG. 22.

Figure 24:
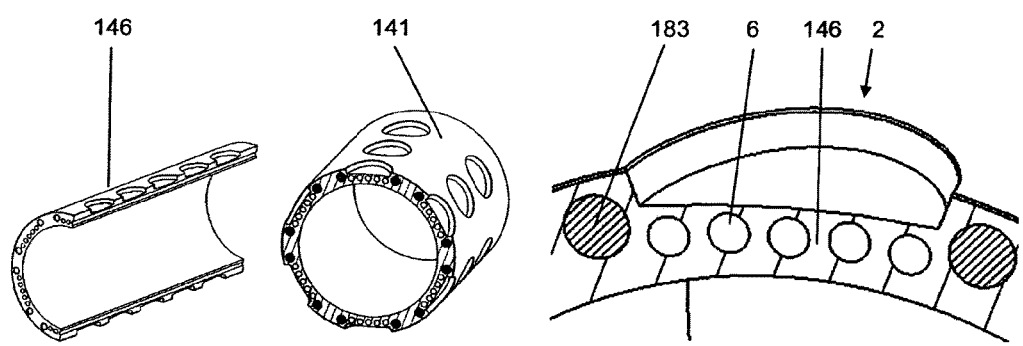
FIGS. 24-27 show the utilization of fluid barriers.

Another embodiment of the present invention is depicted in FIG. 24. Here the drum consists of two members 141, 146 and preferably every product cavity 2 is individually machined into the porous inner member 146. This inner member 146 is a thick walled tube out of porous material. The outer member 141 is a rolled thin sheet metal plate. Both members are fitted tightly to each other as described above. Fluid passages 6 are arranged in the inner member 146 so that during discharge of the product air will escape uniformly over the area of the product cavity 2. Barriers 183 can be provided to prevent that air flow escapes from one row to the other. Barrier 183 can be for example created by milling a groove in the porous material. In the present case a hole, that extends over the entire lengths of the drum, is drill and subsequently filled with a non-air permeable material. The inner circumference of the porous tube 146 is preferably also sealed, to avoid air leakage. All gaps and joints are preferably sealed by welding/brazing solder to component agents epoxy or the like. In another preferred embodiment, the outer member 141 is a metal layer, for example produced by a spraying process, preferably a thermal spraying process. A metal or metal-alloy is sprayed on the surface of the drum.

Figure 25:
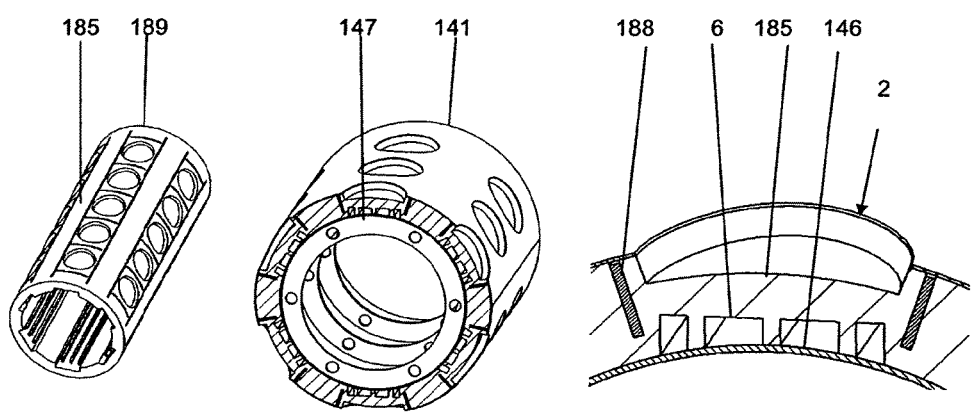

In the embodiment according to FIG. 25, the tube comprises three layers. The intermediate member 185 is a thick-walled tube of porous material, here porous metal. The outer member 141 is a rolled thin sheet plate and the inner member 146 is also preferably a relatively thin metal plate. All members are tightly fitted together, as described above. Fluid passages 6 are arranged in the intermediate member so that during discharge of the product air will escape uniformly over the area of the product cavity. The barrier 188 can be provided to prevent air flow escape from one row to the other. Barriers 189 can also be provided to prevent air flow escape from one cavity to the next in the same row. The barriers can be created by milling a groove in the porous material and fill it with a non-air permeable material. In the present case, the drum comprises reinforcement means, here rings 147, to prevent that the inner member will shrink and pulled inward due to the welding process or during production or cleaning.

Figure 26:
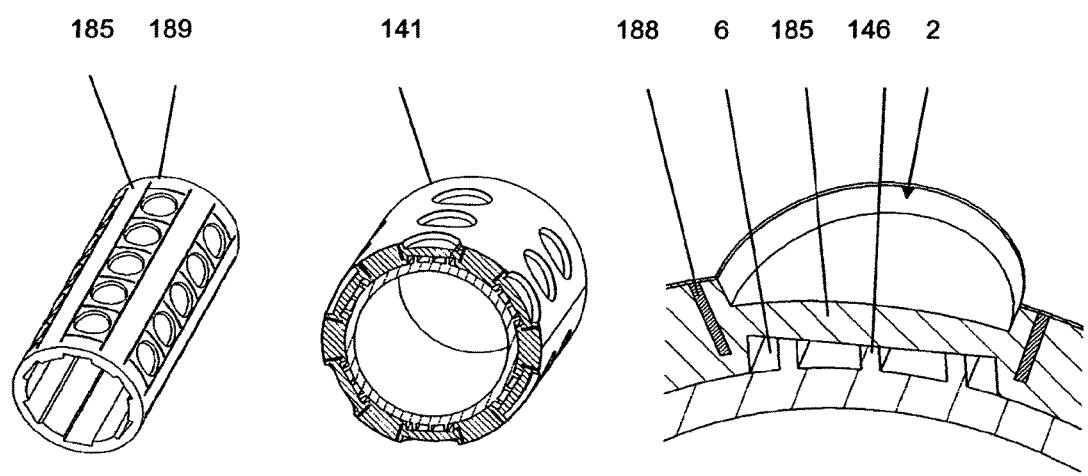

FIG. 26 shows yet another embodiment of the present invention. In this case, the intermediate member 185 is a thick-walled tube of porous material, e.g. metal, and the outer member 141 is a rolled thin sheet metal plate. The inner member 146 is a relatively thick-walled tube from solid material. All members are tightly fitted together as described above. In this embodiment, the fluid passages 6 are arranged in the inner member in a way that, during discharge, air will escape uniformly over the area of the product cavity. It is also possible to provide the fluid passages 6 in the intermediate member instead of the inner member. Barriers 183 can be provided to prevent air escape to other rows. An inner member is provided to prevent that, during discharge of the formed product, air will escape via the intermediate member. Further, it increases the strength and stiffness of the drum.

Figure 27:
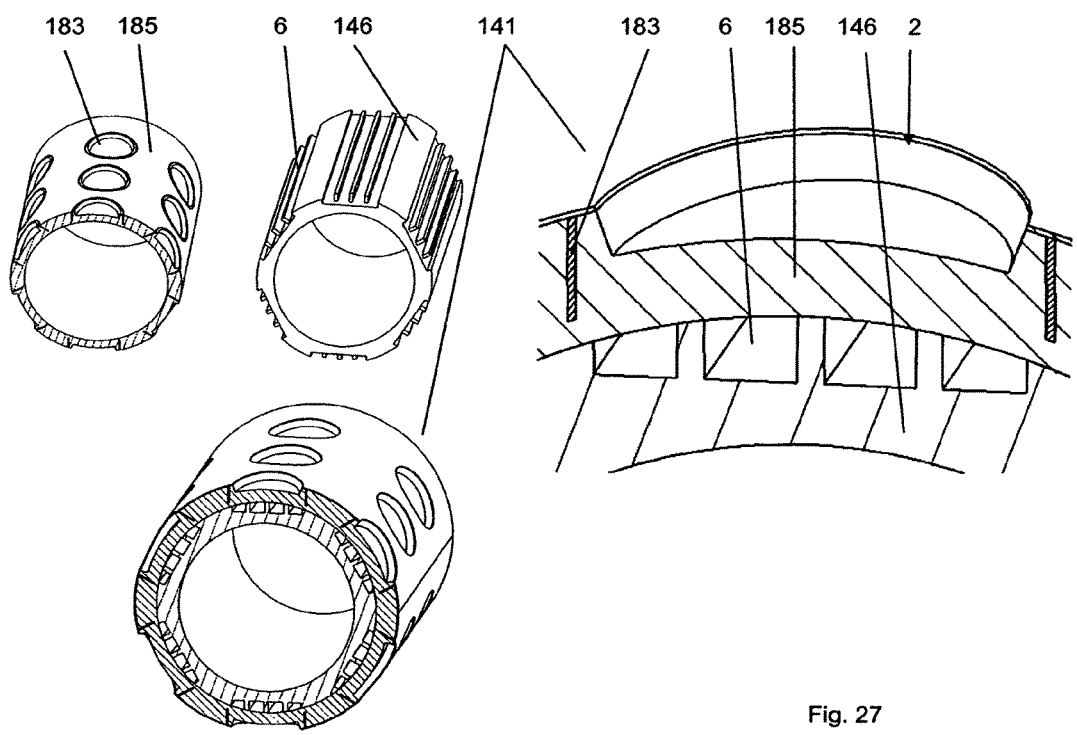

FIG. 27 shows yet another embodiment of the inventive food forming drum. In comparison to the embodiment according to FIG. 26, to which reference is made, the barriers 183 are not parallel to the sidewall of the cavity, but shaped around the circumference of the cavity. Additionally, the separation/support walls of the channels do not extend into the outer member, as this is the case in the example according to FIG. 26.

Figure 28:
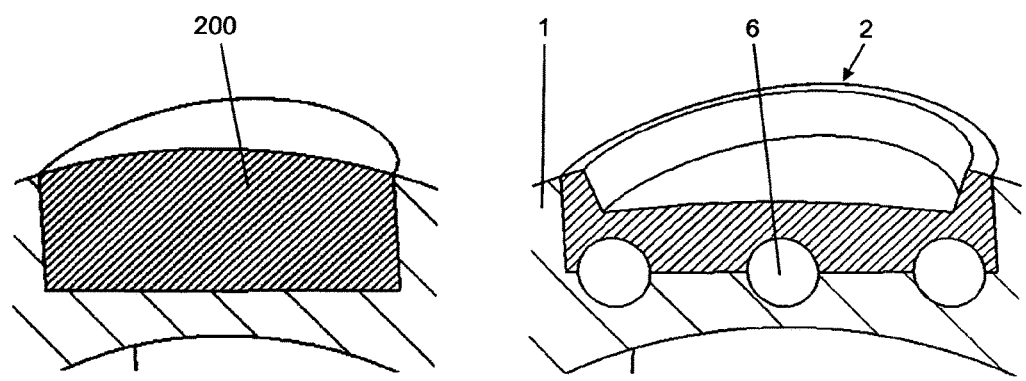
FIG. 28 shows the deposition of porous material in an insert.

FIG. 28 shows yet another embodiment of the present invention. In this case, a relatively thick-walled, non porous tube is provided into which recesses are machined, for example milled. Into this recess a porous material 200 is deposited which is subsequently, preferably machined, to provide a product cavity and to provide fluid passages 6 in the drum. The deposition of the porous material can be done by sintering and/or 3D-metal printing.

Figure 29:
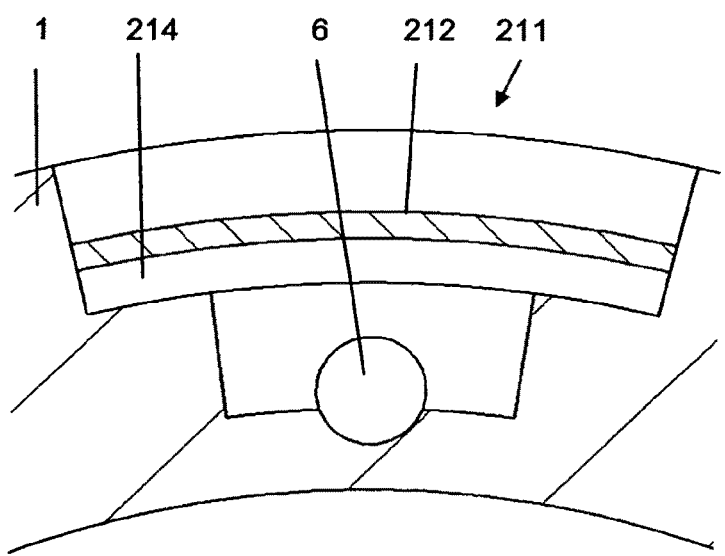
FIGS. 29-32 shows various designs of the porous insert.

In the embodiment according to FIG. 29, during discharge of the product and/or during cleaning, the fluid flows only through the porous bottom wall 212.

Figure 30:
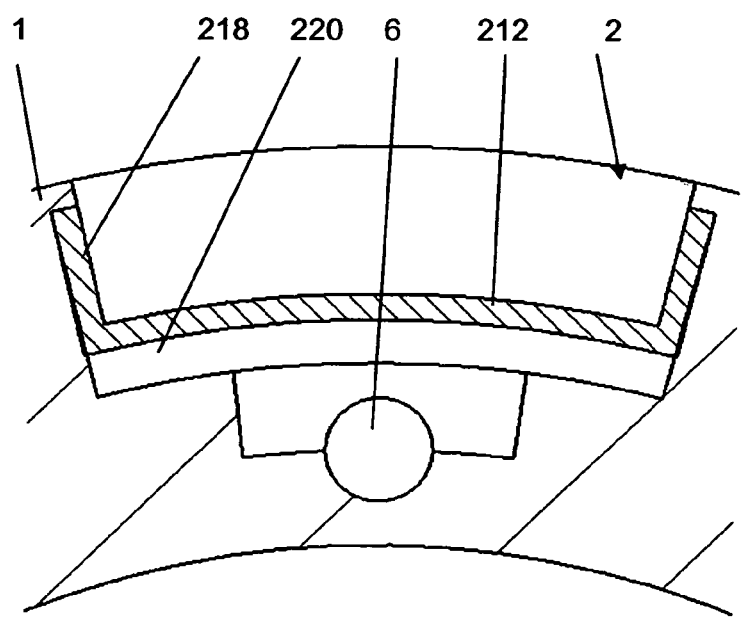

In the embodiment according to FIG. 30, the fluid flows through the bottom wall as well as the sidewalls 218.

Figure 31:
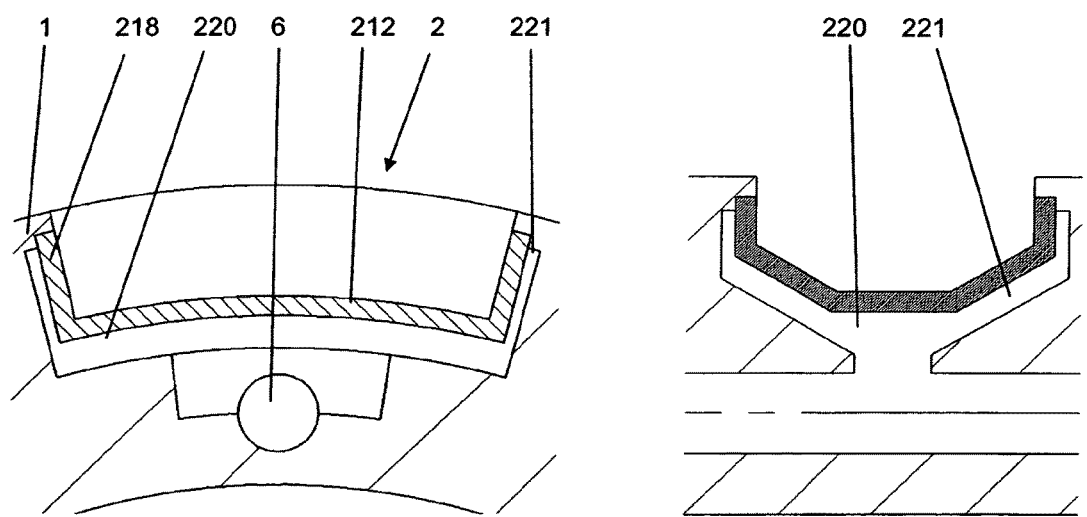

In yet another embodiment according to FIG. 31 the fluid flows through the porous bottom wall 212 and through the porous sidewalls 218. The fluid channel 220 below the porous insert extends over the bottom as well as at least partially over the sidewalls.

Figure 32:
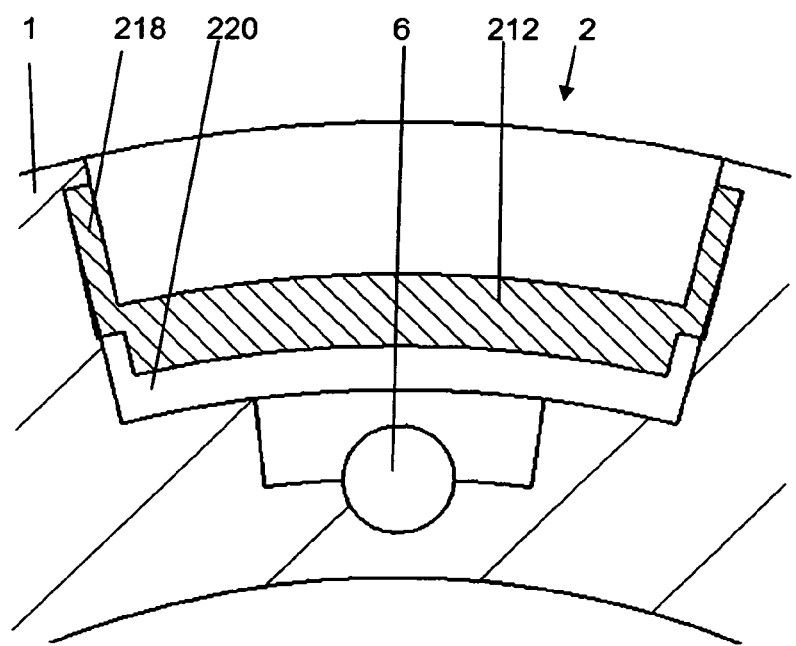

In the embodiment according to FIG. 32, the bottom 212 and the sidewalls 218 have different thicknesses in order to achieve, that the flow through the sidewalls and through the bottom is essentially the same. The person skilled in the art understands, that other flow-pattern can also be desirable.

During filling of the product in the cavities, entrapped air in the product cavity will escape through the permeable walls and through the channel 6. Depending on the porosity of this cavity the channel can be used, during filling, to connect vacuum to the channel 6 to evacuate the air which is entrapped in the cavity. During discharge of the formed food product out of the cavity, air under pressure will be connected to the channel 6. This air will flow via channel 6 beneath the porous cavity and from there through the porous material and thus loosens the adhesion between the porous material and the food product. Preferably, a porosity will be used which is suitable for most food products to be formed. This depends mainly on parameters like the porosity of the cavities, the used food product, the product height and the diameter of the product. In case of porosity is too large, residues will be left inside the porous material or on top of the porous material after discharging of the formed product. A small porosity has too much flow resistance. However, a certain flow resistance is desired in order to spread the air uniformly over the entire porous surface, which is in contact with the food product.

Figure 33:
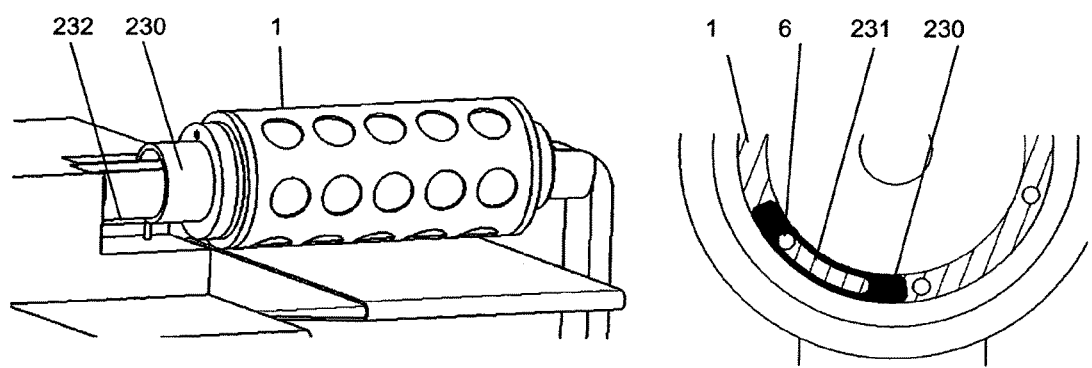
FIGS. 33-35 shows the utilization of a cover 230.

As already said above and as shown in FIG. 33, the inventive drum is place in an food forming apparatus, where it rotates. In case that the drum rotates counter clockwise, the food mass is preferably inserted into the product cavities in a 10-1 o'clock position. The instant, when the discharge product starts based on gravity, is mainly dependent on the structure of the used product. In case, a sticky food product is processed, the discharge of the product and thus the fluid supply has to start earlier in comparison to processing a less sticky product.

In a first embodiment the supply of compressed fluid is already embedded in the cover and drum design. The drum is provided with fluid passages which extend from one end-cap 7 to the other end-cap. A cover 230, provided on one side with a fluid supply connection 232, will be positioned during production against the head of the drum. The cover 230 is in a stand still position. During production the cover is supplied preferably constantly by a fluid. The discharge of fluid into channel 6 starts, when the respective channel 6 is at least partially congruent with the recess 231 in the cover 230. The duration of the fluid-supply to the channels depends on the length of the recess 231 and the speed of rotation of the drum.

Figure 34:
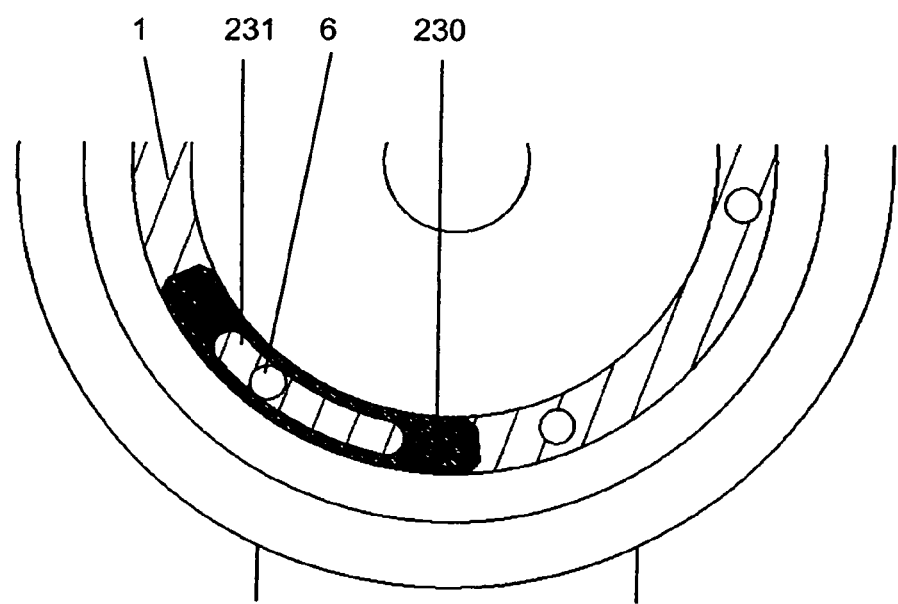

In a second embodiment, which is depicted in FIG. 34, the cover is again in a stand still position. However, here a valve is opened for fluid supply. The start of the fluid supply can easily be changed preferably on an operating panel by changing the instant, when the supply valve is opened. Other than that reference is made to the description according to FIG. 34.

Figure 35:
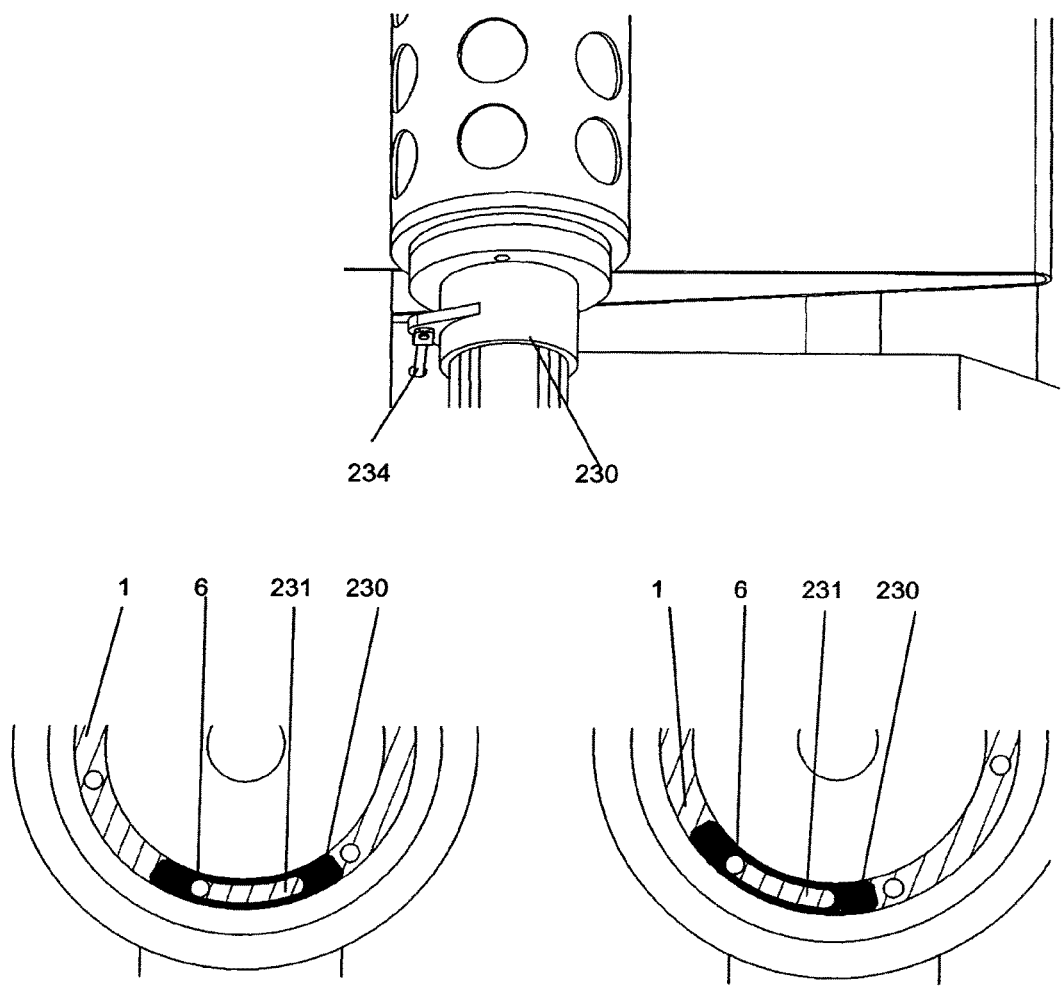

FIG. 35 shows yet another embodiment of the fluid supply. Here the cover is supplied constantly with fluid and the instant of the fluid flow to the channel 6 is controlled mechanically. This can be done by rotating the cover. In the lower left hand and right hand figures the change of the start position of the fluid supply to the channel 6 is depicted.

Figure 36:
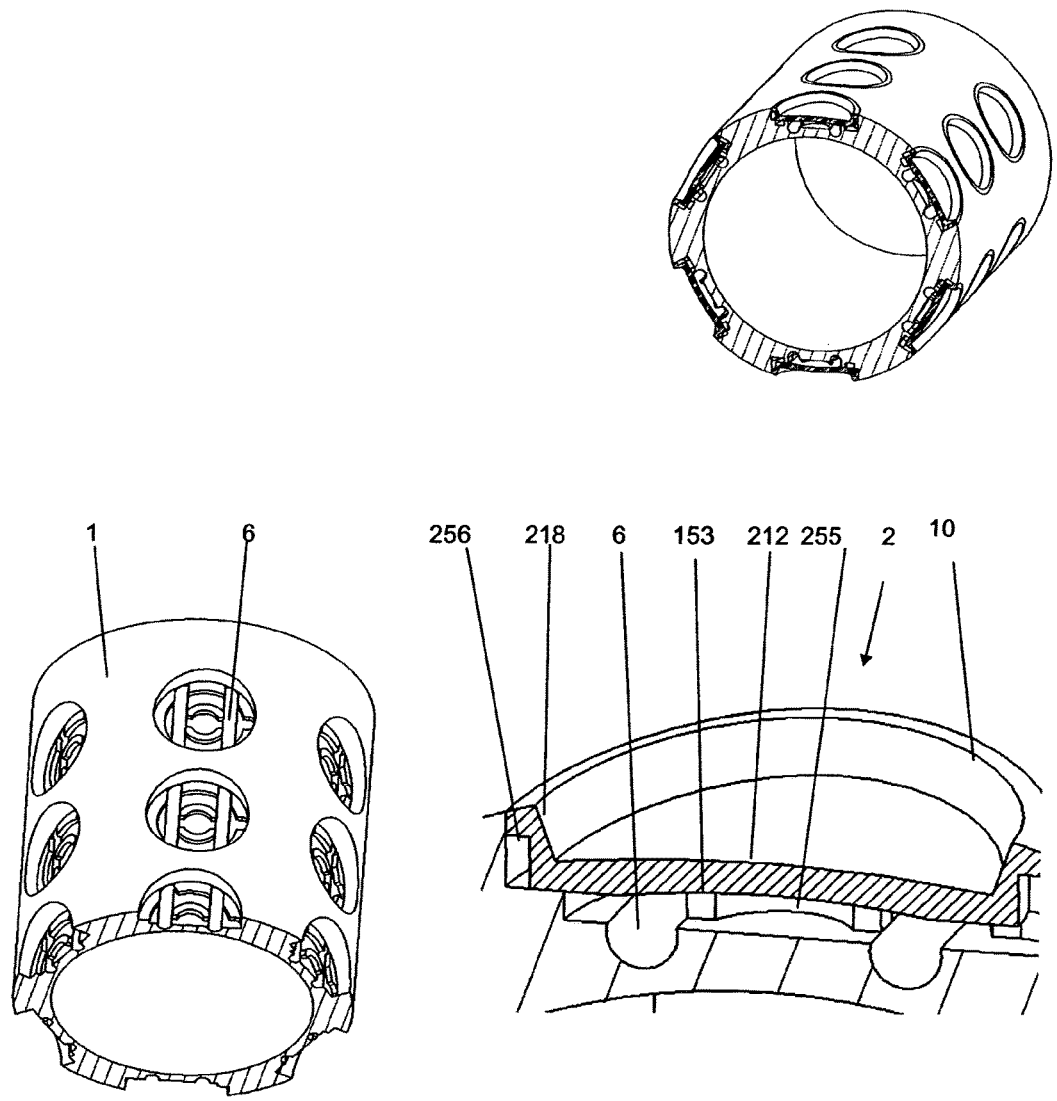
FIGS. 36-38 show a multitude of parallel fluid channels per row.

In case large products are formed it can be desirable, as depicted in FIG. 36 to have a multitude of fluid passages 6, here 2. The number of passages will mainly be determined by the air of volume which will be needed to discharge the product. The two channels can be supplied with air simultaneously and/or sequentially.

Figure 37:
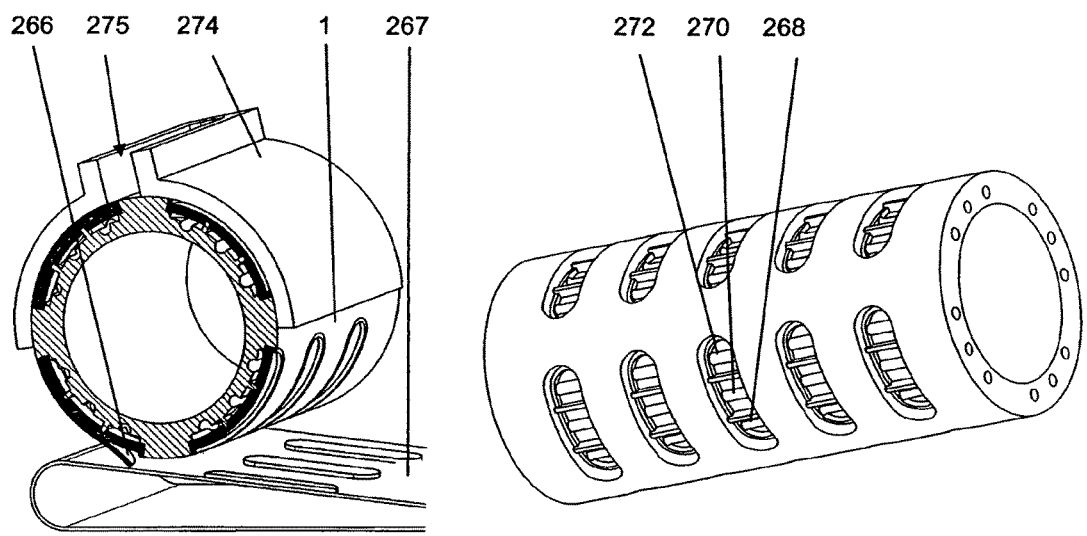
Figure 38:
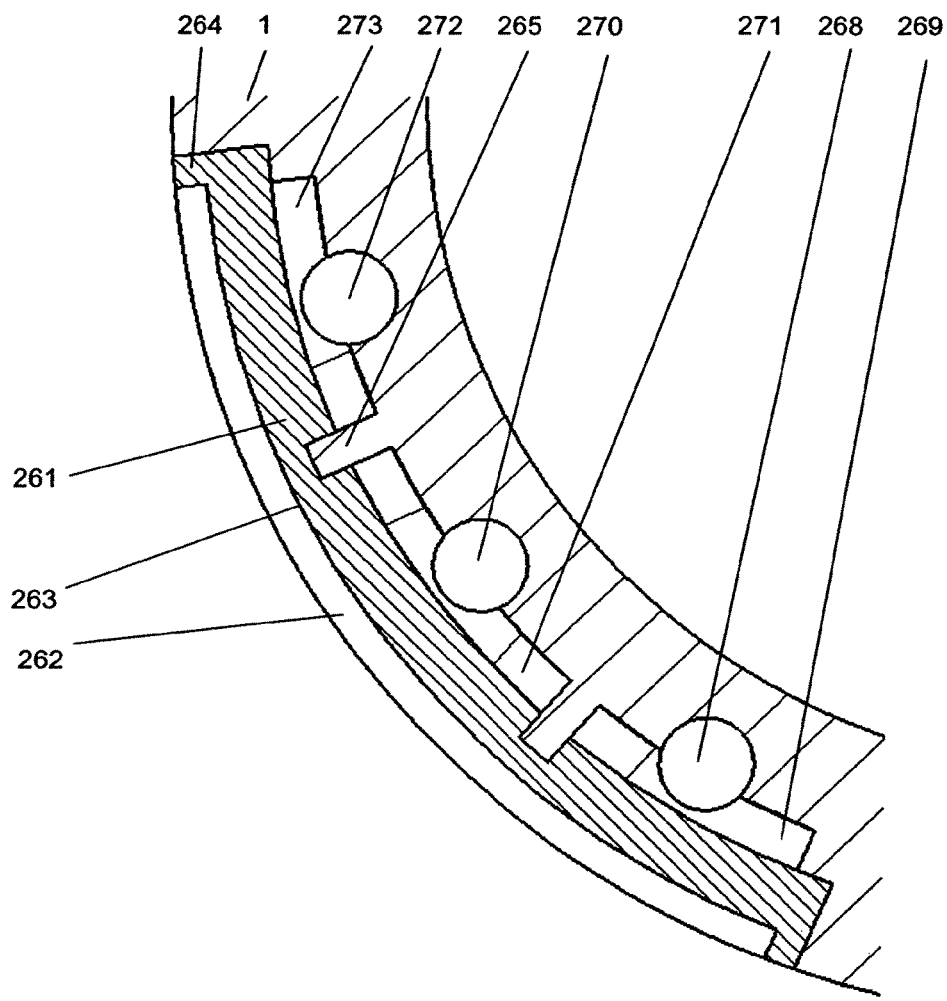

In FIGS. 37 and 38, the forming of long products like schnitzel is shown. Here, the product cavity 262 is also long in circumferential direction of drum 1. To avoid distortion of the formed food product on the outfeed belt 267, the entire formed product should not be discharged at once but in two or more stages. This can be achieved by providing two or more fluid channels. In FIGS. 37 and 38 every compartment has its own fluid passage 268, 270, 272 and each compartment has its own fluid channel 269, 271, 273 each extending from one front end of the drum to the next. Each compartment is connected partially to the formed product. The compartments are divided by dividers 265 which are, in the present case part of the drum an in another embodiment part of the insert. The divider can also act as a support as the relatively weak porous material.

During filling of the product entrapped air in the product cavity can escape via the porous part to the fluid channels and from there to the ambient. During discharge of the formed product, first air will be supplied to fluid passage 268 and from there to compartment 269. The first part of the formed product then becomes loosed from the porous wall and will be placed on the outfeed belt as shown in the drawing. Then the successes passage 270 will be provided with air and in the next step the passage 272 will be provides with air in the final step.

Figure 39:
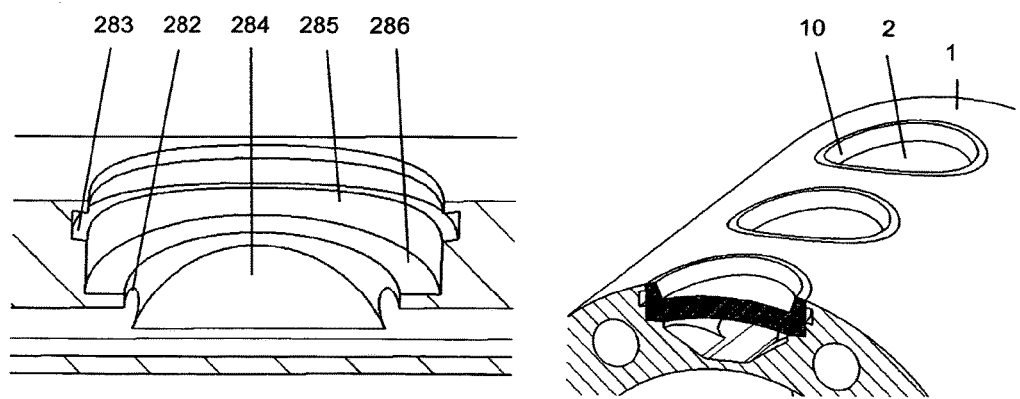
FIG. 39 shows the design of the fluid channel in a casted drum.
Figure 40:
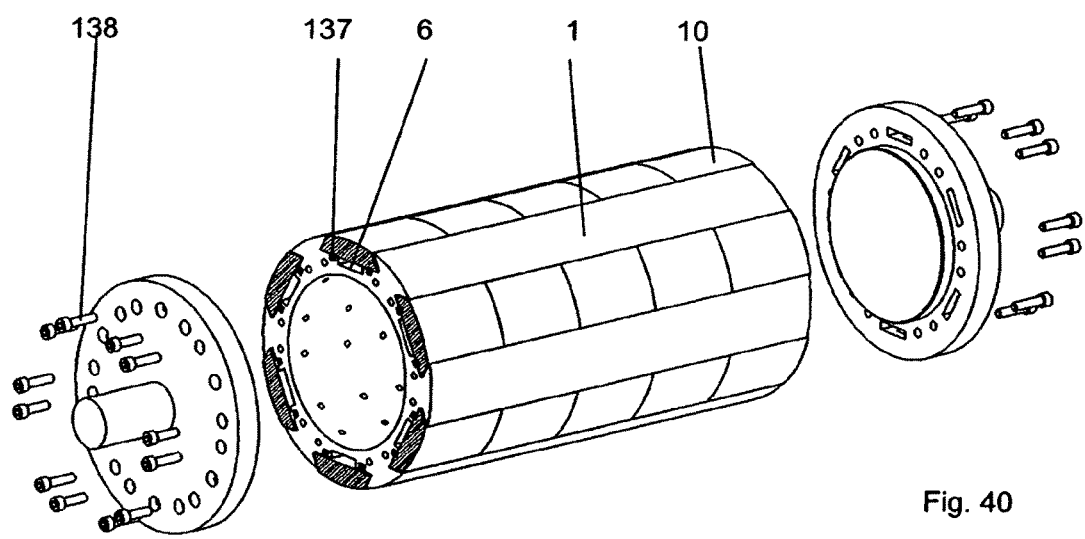
FIGS. 40-44 show another embodiment of the inventive drum.
Figure 41:
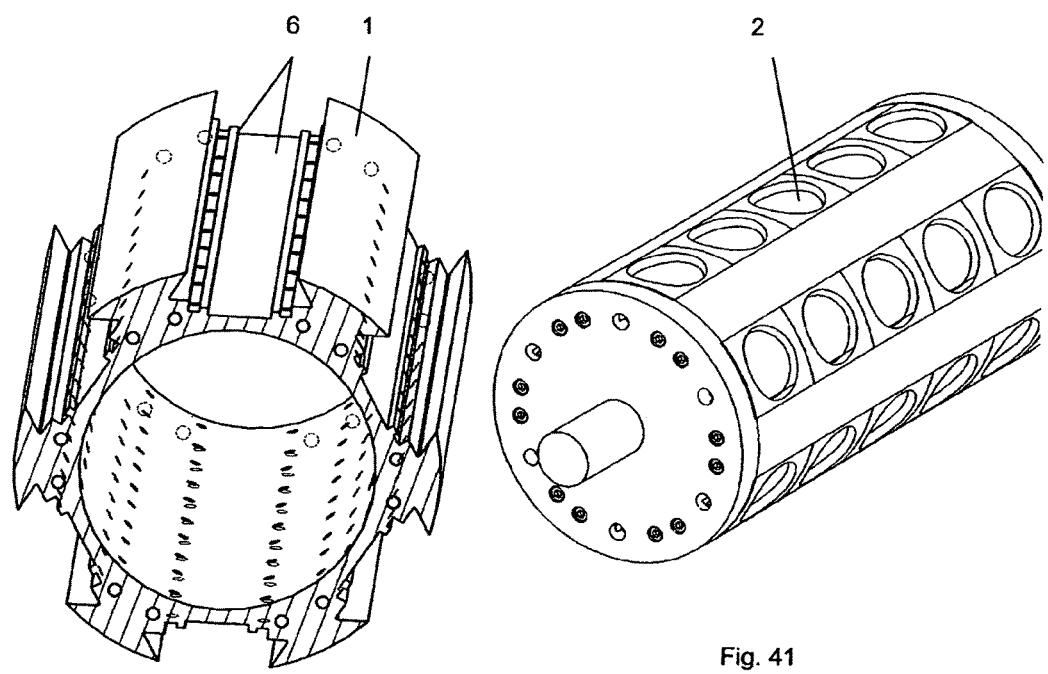
Figure 42:
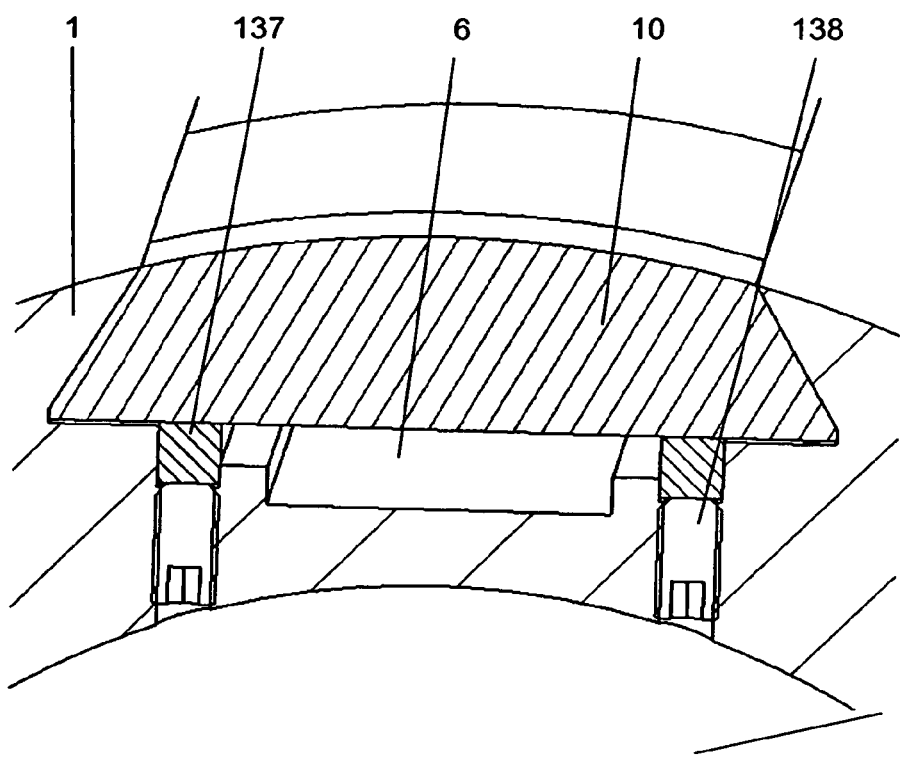

FIG. 39 shows the design of the fluid channels. In general it is important, that the cleaning fluid passes all passages, channels and porous parts. Due to the resistance of the porous material, the fluid flow will have a low speed. Even then all remaining particles have to be discharged out of the drum. During the cleaning process remaining particles in the channels, compartments and passages should be discharged with a cleaning fluid via the passages to the outside of the drum. Remaining particles in the porous part should be discharged with the cleaning fluids through the porous structure of the outside of the drum. All remaining particles can only be discharged if there are no blind spots. Channels, compartments and passages should be large enough as much as possible straight and provided with roundings to prevent that flow of cleaning a fluid will be blocked.

In the embodiment according to FIG. 39, the passages 282, the channels 283, 284, the recess for the insert 286 can be included in the cast. As recess 285 in eventually the support for the insert 286 have to be machined later to the right dimension.

FIGS. 40-44 show yet another embodiment of the inventive food forming drum 1. In the present case, the drum 1 comprises one groove per row of cavities, which extends over the entire lengths of the drum. In the present case, the cross section of the groove is dove tailed. Inserts with a corresponding diameter, in the present case one insert per product cavity, can be inserted from a frontend, preferably each frontend, into the groove. The inserts 10 are at least partially made from a porous material and the cross section is shaped such, that there is a form-fit between the groove and each insert, respectively, due to the dove tailed cross section. Preferably, each row comprises one or more pressure elements 137, which pushes the inserts 10 towards the circumference of the drum and thus reduces the gap between the insert and the surface of the drum. The gap between the insert and the drum can be closed as presented above. A fluid passage 6 is provided between the insert 10 and drum 1. The joint length of all inserts is preferably longer than the longitude extension of the drum. After the inserts have been placed into the drum, the inserts can be pressed into against the drum by means of one or more pressure element(s) and one or two end cap(s) is/are provided at least at one front-end of the drum.

Figure 43:
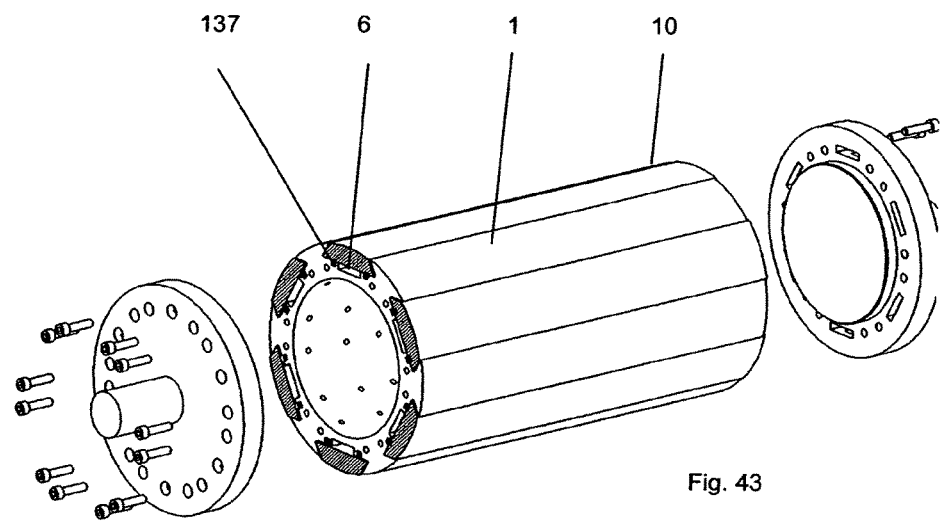
Figure 44:
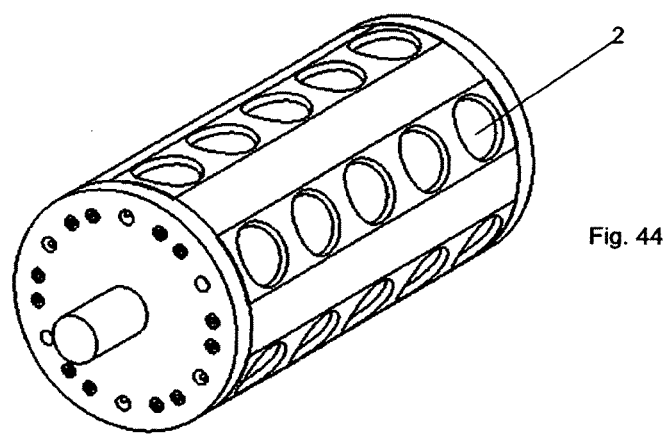

In the embodiment according to FIG. 43, only one insert per row is provided which comprises all product cavities of this row respectively. However, it is also possible to have a multitude of inserts per row, whereas each insert may comprise more than one cavity.

Figure 45:
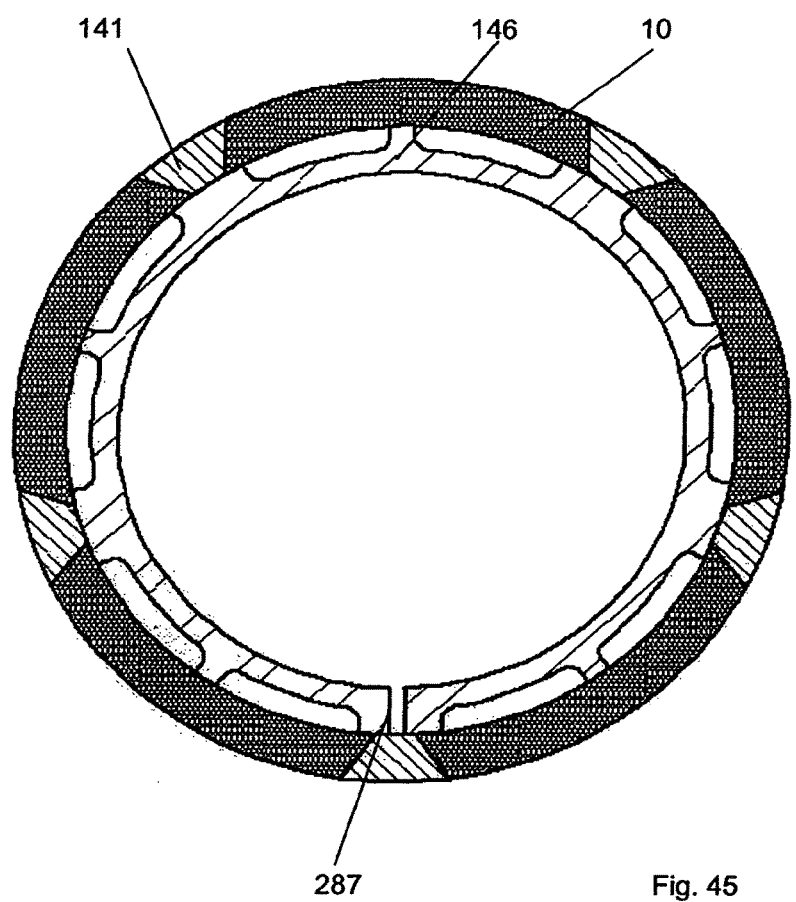
FIG. 45 shows another embodiment of the inventive drum.
Figure 46:
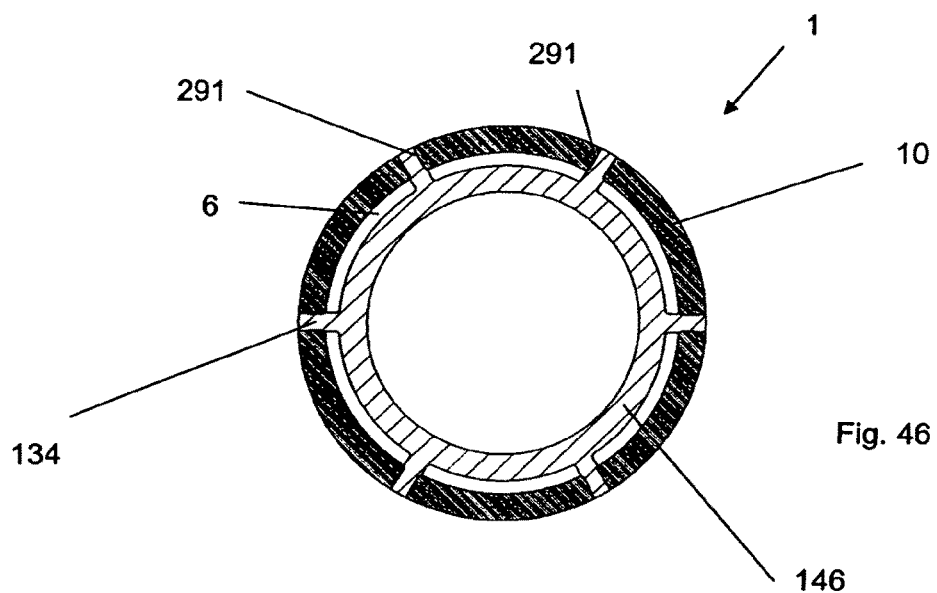
FIGS. 46-53 show yet another embodiment of the inventive drum.

FIG. 45 shows another embodiment of the inventive drum. The drum comprises an inner member 146 and an outer member 141. In the preset case, each row of cavities (here fife) comprises a multitude of porous inserts 10, placed in parallel along the axis of the drum. The porous inserts 10 will be placed from the inside of the outer member 141, here a relatively thick walled tube, into a recess of the outer member. After insertion each insert lies at least partially against the inner circumference of the recess, respectively. In the present case, the cross section of the insert is at least partially dove tailed and its outer circumference lies at least partially against the inner circumference of the recesses in the outer member. Each recess extends through the entire outer member and narrows at least partially from the inner diameter to the outer diameter of the outer member 141. The inserts can be round, rectangular, square, oval or the like. One insert can comprise one or more cavities. The inserts can be connected to the outer member by material bonding. A gap between the porous insert and the outer member can be closed by means as described above. After the porous inserts have been placed in recesses of the outer member, respectively, the inner member 146 is inserted into the outer member and fixed to the outer member. The inner member 146 preferably fixes the inserts 10 in their respective position in the outer member. In the present case, the inner member 146 has a slot 287 which extends over its entire length. The diameter of the inner member 146 is preferably larger than the inner diameter of the outer member 141. For insertion, the slot 287 of the slightly oversized inner member is elastically compressed, so that the diameter of the inner member 146 reduces. Then the inner member 146 is placed in the outer member 141 and the elastic compression is released. Due to the spring-like force of the inner member expands and is pressed against the outer member 141 and/or the inserts 10. After insertion of the inner member, the slot 287 may be secured against compression and/or, the slot can be widened to increase the pressure of the inner member against the outer member and/or the inserts. The inner member 146 is, in the present case, thick walled tube.

The inner member 146 comprises at its circumference a multitude of channels, in the present case two channels per row of cavities, which preferably extend over the entire length of the inner member. The inserts may be supported by a support member provided at the outer circumference of the inner member, here located between two channels, which takes over part of the load, for example during filling of the cavities in the porous inserts. The person skilled in the art understands that the channels can also be provided at the inner circumference of the outer member 141, as described above.

After the inserts 10 have been inserted and fixed to the outer member 141, the outer diameter of the drum may be smoothened.

Reference is also made to the disclosure regarding FIG. 23.

FIGS. 46-53 show yet another embodiment of the present invention. In this embodiment, the inventive drum 1 comprises an inner member 146, here a drum, which is for example made from stainless steel. This inner member, the drum, comprises at least one, preferably a multitude of longitudinal ribs 134, which preferably extend radially from the circumference of the inner member 146 and which preferably extend over the entire length of the drum and more preferred until the outer circumference of drum 1, as can be seen from FIGS. 47-49, 53. The inner member 146 and the rib(s) is/are preferably one piece. Between two longitudinal ribs, respectively, one or more inserts 10 are arranged, which are at least partially, preferably entirely made from a porous material, as previously described. The cross section of each insert is preferably the segment of a circle. Alternatively, the cross section can be dovetailed. Each insert 10 can, for example, sintered in a mould which is provided with a curved inner- and outer surface. Subsequently, the front ends of the inserts are preferably machined, preferably grinded. During this process step, the shape of the one or more front ends can be changed, if desired, and/or the porous structure of the front ends can be closed to create a strong bonding connection. Preferably, all four front ends of each segment are closed. Each insert may comprise one or more groove(s) and/or fluid-channel(s) as previously described. Each of two opposing front ends 291 of each insert is preferably placed against a rib 134. Each rib preferably comprises two dead stop 290, here a shoulder, for the insert. After the insert has been placed into the recess between two ribs 134, preferably one edge of each front end 291 lies against the dead stop 290, so that each insert is in a clearly defined position, as can be best seen from FIGS. 46, 51 and 52. Between the inside of insert 10 and inner member 146, the inventive drum 1 preferably comprises one or more fluid channel(s) 6, for example to vent the inserts and/or to discharge a fluid through the porous insert 10. Each channel 6 can be machined into the inner member 146 and/or into the insert 10. In the present case, the dead stops 290 are designed such, that a distance is left between the circumference of the inner member 146 and the inside of the insert 10, which serves as the fluid channel 6. This fluid channel preferably extends from one front end of the insert to the other. As can seen particularly from FIG. 52, the inner member 146 and/or the insert 10 may comprise support means 132, here one or more rib(s), for the insert 10. The support means 132 may also be used to define a fluid channel. The distance between two ribs 134 is preferably slightly larger than the distance between the two front ends 291. This simplifies the insertion of the insert between the ribs 134 and/or allows space for a bonding material, for example a glue or a soldering material.

Prior to inserting the insert between two ribs 134, the surface of the insert 10 is preferably, at least partially covered with a soldering film, for example as previously described, which is bonded to the insert 10. This film can be used to fix the insert 10, preferably irreversibly, at the inner member 134 and/or to closed the surface of the insert, where needed.

Each front end 291 of the insert 10 is preferably rigidly and irreversibly connected with a rib 134. This connection is preferably, at least essentially fluid-tight. The connection between the insert 10 and the rib 134 is preferably executed with flux-free soldering, as described above. However other bonding and/or sealing means, for example as described above, can be used additionally or alternatively. In order to improve the soldering, prior to insertion of the insert between two ribs 134, a solder material, for example a paste can be inserted into a longitudinal groove 289 in rib 134. The person skilled in the art understands that the grooves 289 can be alternatively or additionally in the insert 10. Grooves 289 can also be provided in end caps 3 and 4 and in distance piece 288.

Figure 47:
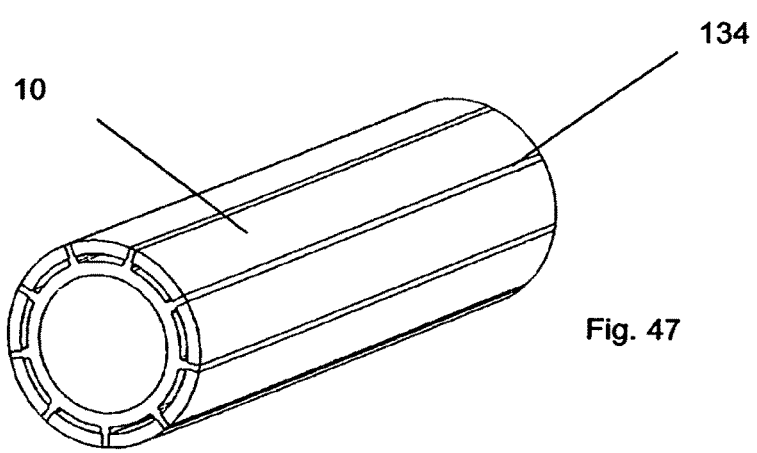
Figure 48:
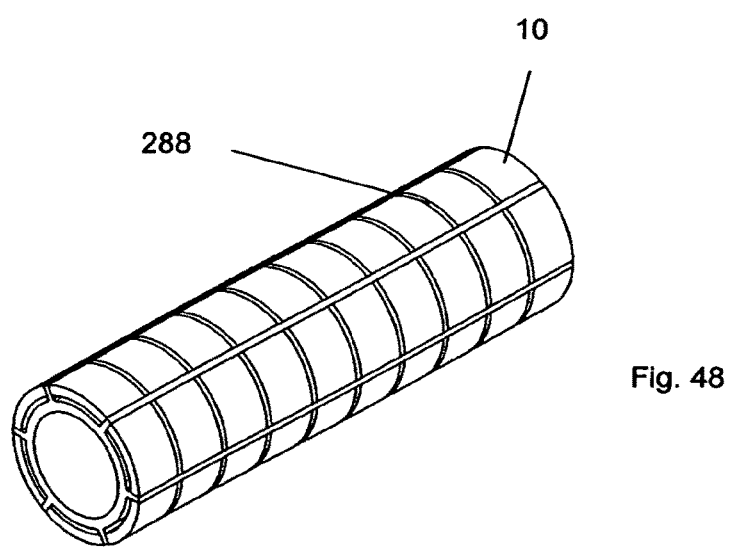
Figure 49:
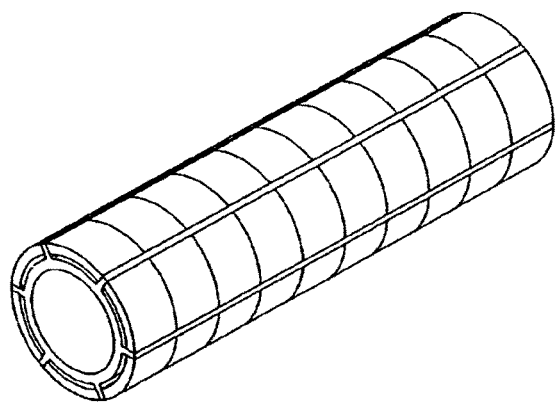
Figure 50:
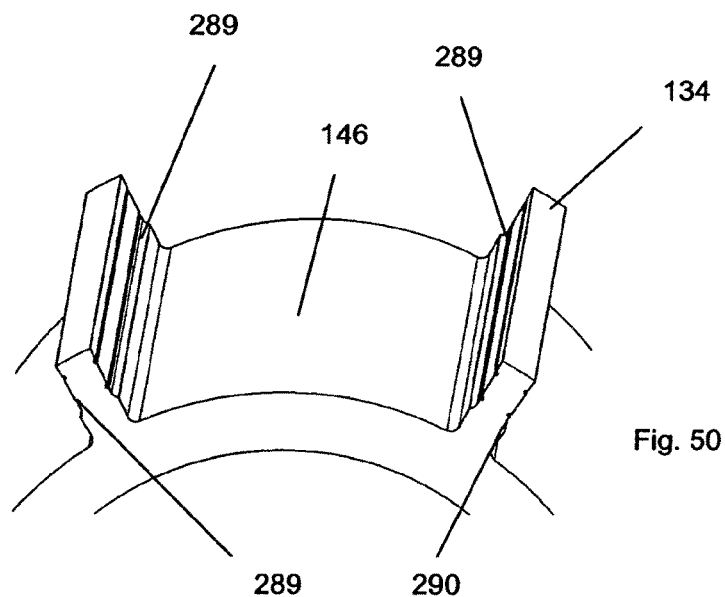
Figure 51:
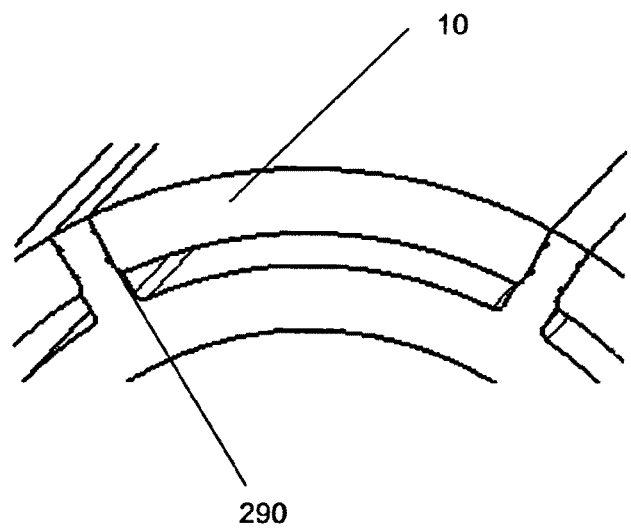

As can be seen, for example, from FIGS. 47 and 48, the insert 10 between two ribs 134 can be a single piece (FIG. 47) or a multitude of pieces (FIG. 48). In case of a multitude of pieces, two pieces can be separated by a distance piece 288, respectively (FIG. 48). This distance piece can be a film or a sheet. Two inserts can be connected by the distance piece 288. However a multitude of inserts can also be placed directly adjacent as depicted in FIG. 49.

When using flux-free soldering as the bonding technique between the insert 10 and the ribs 134, the inserts and the end cap and/or between the inserts themselves, the distance between the parts to be connected is preferably <0.1 mm, more preferably <0.07 mm, here app. 0.05 mm. Each solder joint will be filled preferably with solder film/foil. If needed, additional solder material, for example solder paste in a reservoir 289 between two parts 3, 4, 10, 134, 288 can be provided.

After the inventive drum is assembled, it is heated, for example in an oven and the solder material is liquefied and/or its viscosity reduces to capillary forces the solder material spreads into regions with insufficient coverage with solder material. After the drum 1 exits the heater, it is cooled down and the inserts 10 are irreversibly bonded with the inner member, i.e. they cannot be removed from the inner member without destruction.

Figure 52:
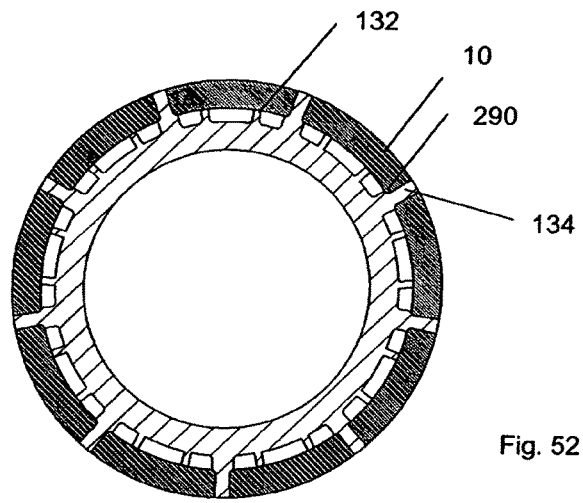
Figure 53:
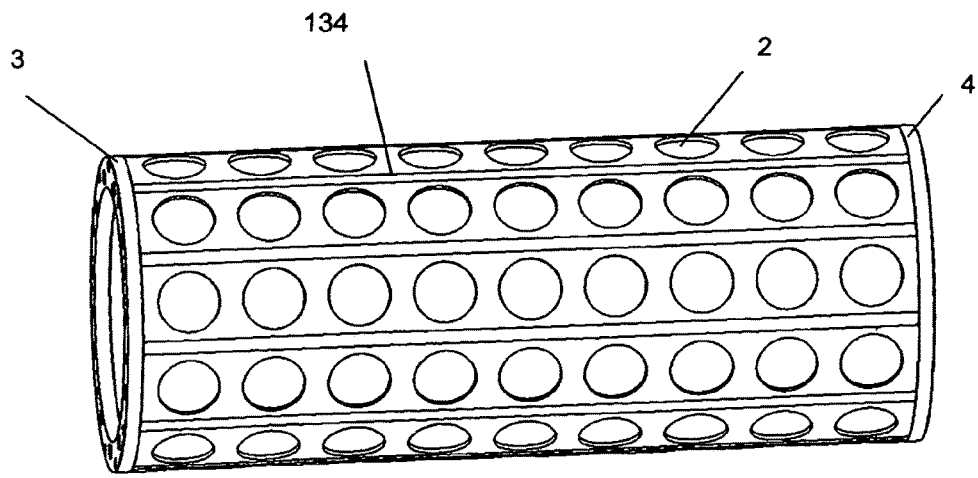

If needed, support ribs 132 can be placed between each product cavity 2 in one row and/or in longitudinal direction preferably parallel to ribs 134, as can be seen from FIG. 52.

The joint length of the, or all insert(s) in one row is preferably longer than the length of the inner member 146. After the inserts 10 have been placed at the inner member, the inserts in one row are preferably tightened and secured, i.e. clamped in longitudinal direction, by two end caps 3, 4.

As one of the final steps, drum 1 is preferably machined into its final diameter. Thereby, the pores on the surface of the inserts are preferably closed. The product cavities 2 can be provided prior or after the inserts 10 are fixed to the inner member 146. However, preferably, the cavities are inserted into the drum in a final machine step.

Figure 54:
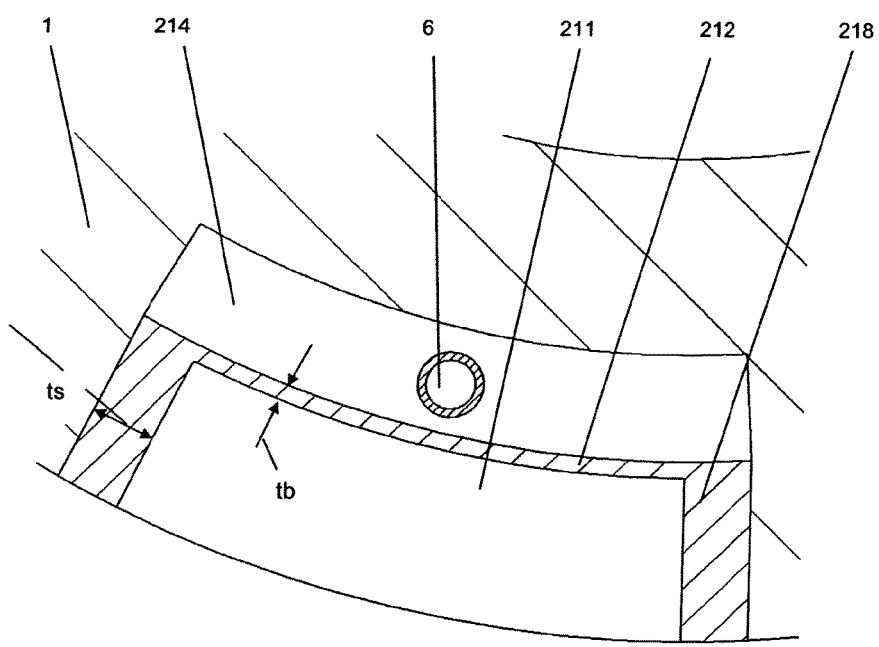
FIGS. 54-57 depict means to influence the sequence of the discharge of a discharging fluid.

FIG. 54 depicts an example in which the thickness tb of the bottom 212 is smaller than the thickness is of the sidewall 218. When fluid via passage 6 is directed to fluid channel 214 this fluid will first enter the product cavity 211 via the bottom 212 and subsequently via sidewall 218 due to the higher flow-resistance of the sidewall and/or the longer distance this fluid has to pass.

Figure 55:
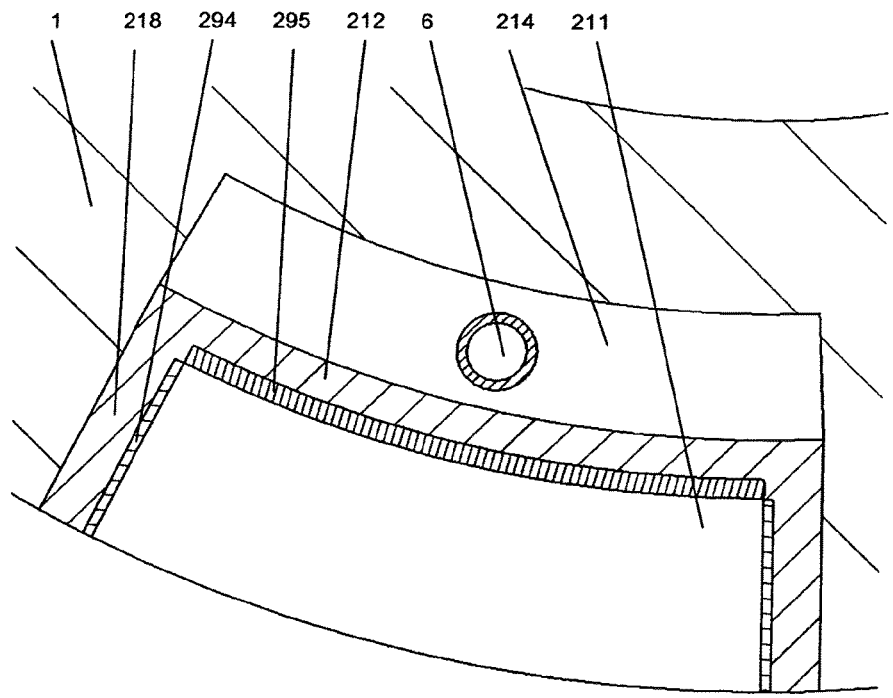

Reference is now made to FIG. 55. The product cavity within the porous material can be produced, for example by milling. The flow of fluid through the bottom 212 or the sidewall 218 can be, for example, influenced by the tool which will be used (type of milling cutter, material milling cutter, number of cutting edges, angle cutting edge, etc) and/or by a milling parameter (cutting speed, feed rate, etc). By machining the sidewall 218 by method 1 (294) and the bottom 212 by method 2 (295) the surface and permeability of the sidewall and the bottom will be different which will result in different flow characteristics. Each method, for example, closes the pores on the surface of the sidewall and the bottom differently. Preferably, method 1 and 2 is milling, grinding, EDM and/or polishing. Preferably, the sidewall has a lower permeability than the bottom.

Figure 56:
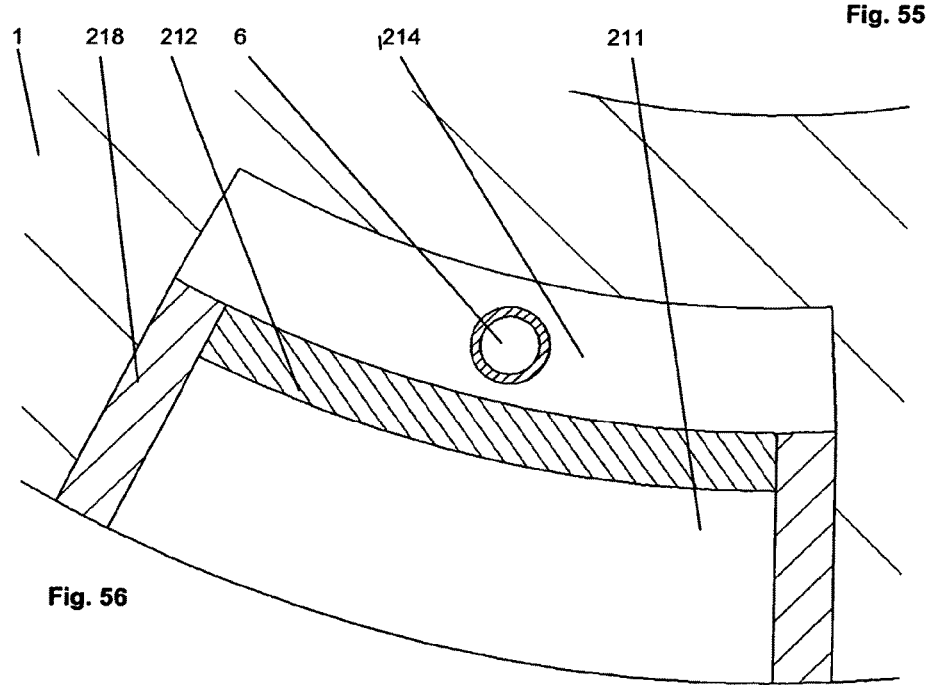

FIG. 56 shows a cavity, whereas the bottom is made from a material with a different porosity than the material of the sidewall. Again this results in a phase lack between the ejection of a fluid through the bottom and through the sidewall. Preferably, the porosity of the bottom material is higher than the porosity of the sidewall material.

Figure 57:
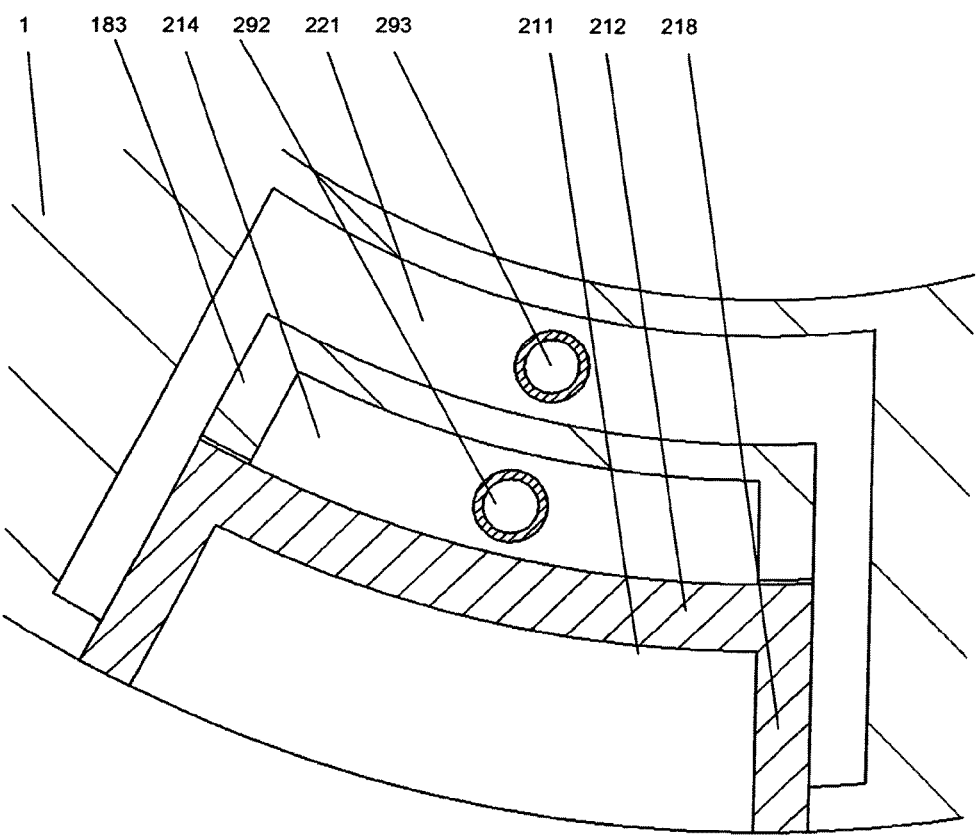

FIG. 57 shows an example with a multitude of passages; one separate passage 292 for the bottom and one separate passage 293 for the sidewall.

When fluid is directed to both passages 292 and 293 at the same time this fluid will enter the product cavity at the same time from the bottom and from the sidewall. When fluid is directed first to passage 293 which is connected to the porous structure of the sidewall and some time later to passage 292 which is connected to the porous structure of the bottom, the fluid will enter the product cavity first via the sidewall. When fluid is directed first to passage 292 which is connected to the porous structure of the bottom and some time later to passage 293 which is connected to the porous structure of the sidewall the fluid will enter the product cavity first via the bottom. When processing a sticky mass, the formed food product will stick to the cavity due to the adhesion forces between product and the sidewall. By using different fluid pressures this problem can be solved. First fluid with a relatively low pressure can be directed to passage 292 to eliminate adhesion forces between formed product and bottom wall. Then fluid with a relatively low pressure can be directed to passage 293 to eliminate adhesion forces between formed product and sidewalls. Then fluid with higher pressure can be directed to passage 292 (bottom wall) to remove product from cavity. The person skilled in the art understands, that all features of the examples can be combined among each other and new claims can be worded.

Figure 58:
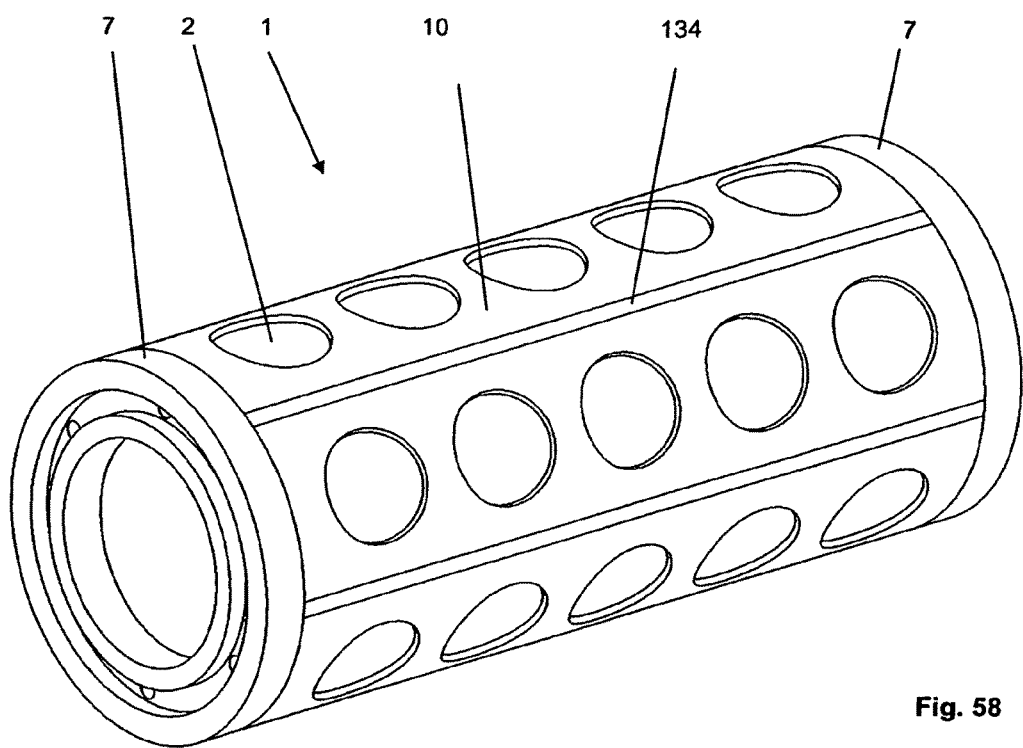
FIG. 58 depicts a drum with one insert per row

FIG. 58 shows a preferred embodiment of the drum. The drum comprises a essentially cylindrical inner member with grooves for at least one, preferably a multitude of inserts 10. Preferably each insert is sintered, preferably from a metal material. Each insert is fixed, preferably by an adhesive connection, to the drum. More preferably, each insert is soldered to the drum. Preferably, each insert extends, at least essentially, over the entire length of the drum. More preferably, the drum comprises an end cap 7, more preferably at each end. Each end cap is preferably designed as a circular ring. The end cap is connected to the drum preferably by a form- and/or force-fit, more preferably screwed to the drum.

LIST OF REFERENCE SIGNS

1 Drum
2 Product cavity
3 First front end of the drum
4 Second front end of the drum
5 Journal
6 Fluid passages in longitudinal direction drum
7 End-cap
8 row of cavities
10 Insert
11 Closed region
12 Region with porosity A, sidewall
13 Region with porosity B, bottom
31 Recess for insert
32 Radial fluid channel. Radial fluid channel in the insert, radial fluid in the inner member
36 Fluid channel in insert
37 Porous top surface
42 Porous part of the insert 43 Back-up ring
45 Contact area
50 Fluid channel
51 Contact surface subassembly
53 Welding/Brazing line
54 Welding/Brazing line
56 Solder
57 Two component bonding agent
62 Distribution channel insert
63 Distribution channel recess drum
64 Epoxy bridge
65 Supply point/Sealing plug
66 Discharge point/Sealing plug
72 Cover
73 Bonding means
83 Locking pin
86 fluid passage in locking piece
88 Fluid channel in insert
89 Flange
90 Locking piece
101 Fixing means
102 Closing means
119 Metal insert
132 Support means, Support rib
134 Longitudinal rib
137 Pressure Element
138 Fixing means, screw
141 Outer member
143 Fluid passage in outer member
145 Flange
146 Inner member, Inner member made from porous material, structure, structure made from a solid material, preferably steel
147 Reinforcement ring
153 Support means, Support rib (part of inner member)
183 Barrier, Barrier around the product cavity 2
185 Intermediate member out of porous material
188 Barrier longitudinal direction
189 Barrier circumferential direction
200 Sintered porous material
211 Product cavity
212 Porous bottom wall
214 Fluid channel bottom wall
218 Porous sidewall
220 Fluid channel bottom wall
221 Fluid channel sidewall
230 Cover
231 Recess in cover
232 Fluid supply
234 Drive means
255 Fluid channel for bottom wall
256 Fluid channel for sidewall
261 Insert (porous part)
262 Product cavity
263 Porous bottom wall
264 Porous sidewall
265 Divider/Support rib
266 Partly discharged food product
267 Outfeed belt
268 Fluid passage 1
269 Fluid channel compartment 1
270 Fluid passage 2
271 Fluid channel compartment 2
272 Fluid passage 3
273 Fluid channel compartment 3
274 infeed shoe, sealing means
275 infeed of the food mass
282 Passage
283 Fluid channel for sidewall insert
284 Fluid channel for bottom wall insert
285 Recess
286 Support for insert
287 slot
288 distance piece
289 reservoir for solder material, solder groove
290 dead stop, shoulder
291 opposing ends of an insert
292 fluid passage in longitudinal direction of the drum for the bottom
293 fluid passage in longitudinal direction of the drum for the sidewall
294 machining according to method 1
295 machining according to method 2
ts thickness sidewall
tb thickness bottom

The invention claimed is:

1. A food forming drum comprising:
a multitude of rows each comprising one or a multitude of porous product cavities,
fluid channels in a longitudinal direction of the food forming drum, each of the fluid channels connecting one of the rows of the porous product cavities fluid-wise,
wherein the porous product cavities are provided as one or more inserts,
wherein the food forming drum comprises an inner member that is formed as a drum, the inner member comprises a plurality of ribs that extend radially from the inner member, each of the ribs being defined between two opposing side walls, each of the side walls comprise a shoulder, each of the ribs comprise a constant rectangular cross section that extends over an entire length of the inner member,
wherein the inner member and the ribs are made from one piece,
wherein each of the one or more inserts have a cross section that is a segment of a circle,
wherein each of the one or more inserts have a length that extends between opposing ends of each of the one or more inserts,
wherein each of the one or more inserts are placed between a corresponding two of the ribs extending from the inner member and on top of a corresponding two shoulders of a corresponding two of the side walls, and each of the opposing ends of each of the inserts are irreversibly connected directly to the corresponding two ribs by an adhesive connection, form and/or friction-fit, and
wherein a respective fluid channel is defined between each of the corresponding two ribs, along an entire length of each of the one or more inserts, between an underside of each of the one or more inserts, and a circumference of the inner member.

2. The food forming drum according to claim 1, wherein each of the one or more inserts are connected to the corresponding two ribs by soldering, welding and/or brazing, or by a plastic material comprising epoxy.

3. The food forming drum according to claim 1, wherein each of the porous product cavities comprise at least two regions with different porosities.

4. The food forming drum according to claim 1, wherein each of the porous product cavities comprise a porous part and a back-up ring.

5. The food forming drum according to claim 1, wherein a porous part of each of the porous product cavities and/or the one or more inserts are placed from inside, or from outside, or from a front end into a sidewall of the food forming drum, against a flange or into a groove.

6. The food forming drum according to claim 1, wherein the food forming drum comprises a recess for a porous part of each of the porous product cavities and/or for the one or more inserts,
wherein the recess comprises support means for the porous part and/or the one or more inserts.

7. The food forming drum according to claim 1, wherein the food forming drum comprises a multitude of sidewall members, and wherein an outer member is a thin sheet member relative to an inner member that is a thick walled tube.

8. The food forming drum according to claim 1, wherein each of the porous product cavities are secured to the food forming drum by a sidewall member.

9. The food forming drum according to claim 1, wherein the fluid channels and/or support means is part of the inner member or the one or more inserts.

10. The food forming drum according to claim 1, wherein the food forming drum comprises a multitude of fluid channels per row.

11. The food forming drum according to claim 1, wherein a sidewall of each of the porous product cavities and a bottom of each of the porous product cavities have different flow-resistances regarding fluid flow of a fluid to remove a formed food product from each of the porous product cavities.

12. The food forming drum according to claim 11, wherein a thicknesses of a porous material at the bottom differs from a thickness of a porous material at the sidewall of each of the porous product cavities.

13. The food forming drum according to claim 11, wherein a thickness of a porous material at the bottom is smaller than a thickness of a porous material at the sidewall of each of the porous product cavities.

14. The food forming drum according to claim 11, wherein a surface of a porous material at the sidewall of each of the porous product cavities has a higher flow-resistance than a surface of a porous material at the bottom.

15. The food forming drum according to claim 14, wherein more pores on the surface of the porous material at the sidewall of each of the porous product cavities are closed and/or more reduced in their cross section than pores on the surface of the porous material at the bottom or vice versa.

16. The food forming drum according to claim 1, wherein a sidewall and/or a bottom of each of the porous product cavities have a varying thickness.

17. The food forming drum according to claim 1, wherein the food forming drum is casted.

18. The food forming drum according to claim 1, wherein a porous part of each of the porous product cavities and/or the one or more inserts are connected to the food forming drum by epoxy or molten metal or molten alloy, provided as bridges.

19. The food forming drum according to claim 1, wherein a fluid passage is covered with a cover covering a fluid supply, whereas the cover comprises a recess and/or is pivotable.

20. The food forming drum according to claim 1, wherein the drum comprises a multitude of sidewall members wherein the inner member or intermediate member is entirely a porous member.

21. The food forming drum according to claim 1, wherein the drum comprises a multitude of fluid channels per row and/or every fluid channel is connected to one fluid compartment.

22. The food forming drum according to claim 1, wherein the one or more inserts are irreversibly connected to the drum such that the one or more inserts cannot be loosened without destroying the drum, the one or more inserts, or both.

23. A food forming drum comprising:
i. a drum comprising:
   a. a first front end;
   b. a second front end;
   c. one or more fluid channels arranged between the first front end and the second front end;
   d. a plurality of ribs radially extending from an inner member of the food forming drum and longitudinally extending between the first front end and the second front end, each of the plurality of ribs being defined between two sidewalls, and each of the sidewalls having a shoulder, each of the ribs comprising a constant rectangular cross section that extends over an entire length of the food forming drum, the ribs and the inner member are made from one piece, and the ribs extend from the inner member to an outer surface of the drum;
ii. one or more rows of product cavities provided as one or more inserts, each of the one or more inserts comprising:
   a. a porous sidewall;
   b. a porous bottom surface; and
   c. a back up ring extending around a circumference of the porous sidewall so that a fluid is prevented from leaking through the porous side wall, the back up ring contacts at least a top portion of the porous sidewall;
   d. a length that extends between opposing ends of each of the one or more inserts,
wherein a cross section of each of the one or more inserts is a segment of a circle,
wherein the opposing ends of each of the one or more inserts are placed between two corresponding ribs and on top of two corresponding shoulders that are on two corresponding side walls so that an entirety of the porous bottom surface of each of the one or more inserts is elevated from the outer surface of the drum thus defining one of the fluid channels,
wherein the one or more fluid channels are defined between the entirety of the porous bottom surface of each of the one or more inserts and the surface of the drum and along the entire length of each of the one or more inserts, each of the one or more fluid channels fluidly connect one row of the one or more rows of product cavities; and
wherein each of the one or more inserts are irreversibly connected to the two corresponding ribs such that each of the one or more inserts cannot move or be loosened from the drum without destroying the drum, destroying the one or more inserts, or both.

* * * * *